United States Patent
Padmanabhan et al.

(10) Patent No.: US 9,430,505 B2
(45) Date of Patent: Aug. 30, 2016

(54) AUTOMATED DATA WAREHOUSE MIGRATION

(75) Inventors: Rajan Padmanabhan, Phoenix, AZ (US); Asha Uday Patki, Phoenix, AZ (US)

(73) Assignee: Infosys Limited, Bangalore (IN)

( * ) Notice: Subject to any disclaimer, the term of this patent is extended or adjusted under 35 U.S.C. 154(b) by 473 days.

(21) Appl. No.: 13/088,556

(22) Filed: Apr. 18, 2011

(65) Prior Publication Data

US 2012/0265726 A1     Oct. 18, 2012

(51) Int. Cl.
    *G06F 7/00*      (2006.01)
    *G06F 17/00*      (2006.01)
    *G06F 17/30*      (2006.01)

(52) U.S. Cl.
    CPC ................... *G06F 17/303* (2013.01)

(58) Field of Classification Search
    CPC ............. G06F 17/303; G06F 17/30563
    USPC ............ 707/600, 602, 609, 640, 661
    See application file for complete search history.

(56) References Cited

U.S. PATENT DOCUMENTS

| | | | |
|---|---|---|---|
| 6,714,945 B1 * | 3/2004 | Foote et al. ........... | 707/602 |
| 6,996,589 B1 * | 2/2006 | Jayaram et al. ......... | 707/204 |
| 7,457,807 B2 * | 11/2008 | O'Conor ................ | 707/100 |
| 7,664,795 B2 * | 2/2010 | Balin et al. ........... | 707/661 |
| 7,676,478 B2 * | 3/2010 | Rausch ................. | 707/999.1 |
| 8,311,974 B2 * | 11/2012 | Gong .................... | 707/602 |
| 2005/0251533 A1 * | 11/2005 | Harken et al. .......... | 707/104.1 |
| 2005/0262129 A1 * | 11/2005 | Hacigumus et al. ...... | 707/102 |
| 2006/0009962 A1 * | 1/2006 | Monk ................... | 704/4 |
| 2006/0230319 A1 * | 10/2006 | Ryali et al. ............ | 714/38 |
| 2009/0254521 A1 * | 10/2009 | Raman et al. .......... | 707/3 |
| 2010/0211539 A1 * | 8/2010 | Ho ...................... | 707/602 |

OTHER PUBLICATIONS

SAS Institute Inc, The SQL Procedure: VALIDATE Statement, http://web.archive.org/web/20091211183244/http://support.sas.com/documentation/cd1/en/proc/61895/HTML/default/a002473680.htm, Dec. 11, 2009, 2 pp.*

Declaration of Asha Uday Patki under Rule 37 C.F.R. § 1.132, Feb. 1, 2014, 3 pages.

(Continued)

*Primary Examiner* — Marc Somers
(74) *Attorney, Agent, or Firm* — Klarquist Sparkman, LLP

(57) ABSTRACT

Systems, apparatus, computer-readable storage media, and methods are disclosed for allowing analysis, migration, and validation of data from a source environment (such as an RDBMS system) to a target environment (such as a data warehouse (DW) appliance). In one example, a method comprises analyzing a source database, a source ETL environment, a target database, and a target ETL environment to produce configuration data, the configuration data being used for generating a mapping of the source database to a target database in the target database environment, a mapping of the source DDL code to target DDL code in the target database environment, and a mapping of source ETL code to target ETL code for the target database environment, and migrating at least one table from the source database, at least a portion of the source DDL code, and at least a portion of the source ETL code to the target database environment, where the migrating is based at least in part on the mapping generated using the configuration data.

29 Claims, 28 Drawing Sheets

(56) References Cited

OTHER PUBLICATIONS

Declaration of Asha Uday Patki under Rule 37 C.F.R. § 1.132, Exhibit A, Infosys, "DW Migration Factory Solution," *M-Fabr1k/DW Migration Factory* (customer information redacted) (Feb. 2009), 17 pages.

Declaration of Asha Uday Patki under Rule 37 C.F.R. § 1.132, Exhibit B, Infosys, "Solution Overview," *M-Fabr1k/DW Migration Factory* (customer information redacted) (Feb. 2011), 31 pages.

\* cited by examiner

FIG. 15

1500

| | Analysis Workbench | Migration Workbench | Quality Assurance Workbench |
|---|---|---|---|
| Target DW Appliance | Netezza<br>MS Parallel DW<br>Teradata<br>Oracle Exadata | Netezza<br>MS Parallel DW<br>Teradata<br>Oracle Exadata | Netezza<br>MS Parallel DW<br>Teradata<br>Oracle Exadata |
| Source DW Database | Oracle<br>DB2<br>Sybase IQ<br>Teradata | Oracle<br>DB2<br>Sybase IQ<br>Teradata | Oracle<br>DB2<br>Sybase IQ<br>Teradata |
| ETL tool | Informatica<br>DataStage | Informatica<br>DataStage | Informatica<br>DataStage |

FIG. 16

```
#Open I/P file for reading
open( PF, $ARGV[0] ) or die "\"",$ARGV[0],"\": ",$!,"\nUsage", $0 ,"<DDL File>\n";

#Open O/P file in append mode after reading each line
open (DDL, '>CreateTable.txt') or die "Cannot open file for writing\n$!\n";

LINE: while (<PF>) {
    if ( /create\s+table(\s+)(\w+)(.*)/i ) {
        my $table = uc ($+);
    }
    if(/number\(((\s*)(\w+)\,(\w+)\)/i) {
        s/number\(((\s*)(\w+)\,(\w+)(\s*)\)/NUMERIC\($2\,$3\)/ig;
    }
    if(/float\(((\s*)(\w+)\)/i) {
        s/float\(((\s*)(\w+)\)/FLOAT\($1\)/ig;
    } s/\bTINYINT\b/BYTEINT/i;
    s/\bSMALLINT\b/SMALLINT/i;
    s/varchar2/VARCHAR/ig;
    s/NUMBER\(1\)/NUMERIC\(1\)/ig;
    s/NUMBER\(2\)/NUMERIC\(2\)/ig;
    s/NUMBER\(3\)/SMALLINT/ig;
    s/NUMBER\(9\)/INTEGER/ig;
    s/NUMBER\(10\)/BIGINT/ig;
    s/NUMBER\(19\)/NUMERIC/ig;
    s/NUMBER\(20\)/NUMERIC/ig;

Handling Reserved Keywords of Netezza s/\bABORT\b/ABORT_1/i;
    s/\bADMIN\b/ADMIN_1/i;
    s/\bAGGREGATE\b/AGGREGATE_1/i;

# replace primary key with distribute clause
    if ( /primary(\s+)key(\s+)(.*)/i ) {
        print DDL ;
        next;
    } comment constraints and foreign keys
    if ( /foreign\s+key.*/i || /references/i
        || /unique\s+.*/i || /on delete\s+.*/i ) {
        print DDL ;
        next;
    } comment out oracle options
    #create table right parenthesis must be on line by itself
    if ( !/\(/ && /\)/ ) {
        if ( $distribution_key ) {
            # can only have 4 columns in distribution key so
            # only print up to first four columns of PK
            @cols = split /,/, $distribution_key;

if ( $#cols > 3 ) {
                print DDL $_ , " DISTRIBUTE ON
                            $cols[0],$cols[1],$cols[2],$cols[3]);";
            }
            else {
                print DDL $_ , " DISTRIBUTE ON $distribution_key ;";
            }
        }
        else {
            print DDL $_ , " DISTRIBUTE ON RANDOM ;", "\n" ;
        }
        $is_oracle_option = 1;
    } next LINE if $is_oracle_option;

print DDL ;
}
```

```
#-----------------------------------
# Name of the Script:   DB_migration_wrapper.sh
#-----------------------------------

# Loop to run DB_oracle_nzload.sh by loading
tables
# of schema from DB_tablelist.dat
# Consider parameterizing the file containing
list of tables.
#-----------------------------------
cat DB_tablelist.dat | while read table_list
do
sh DB_oracle_nzload.sh $table_list
Done
```

FIG. 18B 1820

```
#-----------------------------------
# Name of the Script:   DB_tablelist.dat
#-----------------------------------
TABLE1
TABLE2
TABLE3
TABLE4
TABLE5
TABLE6
```

FIG. 18C 1830

```
#-----------------------------------
# Name of the Script:   DB_oracle_nzload.sh
# Input Parameter    :  table_name
#-----------------------------------
table_name=$1
#table_name is the table for which data is migrated
#consider parameterizing the connection string from a connection file.(
encrypted file is preferred)
echo $table_name
#-----------------------------------
# Sql plus connection to fetch the select query
#-----------------------------------
select_query=`sqlplus -s   <USERID>/<PWD>@<SERVERNAME> <<EOF
set serveroutput on;
set linesize 10000
set echo off;
set feedback off;
exec QUERY_BUILD('$table_name');
EOF`                                                          } 1840
#-----------------------------------
# Dynamic sql file is created for fetching the data's
# from oracle db.
#-----------------------------------
echo "SET NEWPAGE 0" > $table_name.sql
echo "SET FEEDBACK OFF" >> $table_name.sql
echo "SET HEADING OFF" >> $table_name.sql
echo "SET ECHO OFF" >> $table_name.sql
echo "SET SPACE 0" >> $table_name.sql
echo "SET PAGESIZE 0" >> $table_name.sql        } 1845
echo "SET WRAP OFF" >> $table_name.sql
echo "SET TIMEOUT OFF" >> $table_name.sql
echo "SET TRIMSPOOL ON" >>$table_name.sql
echo "SET LINESIZE 32767" >> $table_name.sql
echo "spool fifo.pipe1" >> $table_name.sql
echo  $select_query >> $table_name.sql
echo "spool off;" >> $table_name.sql
#-----------------------------------
# NZLoad command is initiated and set ready for load
#-----------------------------------
nzload -df fifo.pipe1 -t $table_name  -delim '|' -dateDelim '-'  } 1850
dateStyle DMONY -encoding internal &
#-----------------------------------
# The sql file is executed in sqlplus for getting the data's
# into the pipe fifo.pipe1
#-----------------------------------
sqlplus <USERID>/<PWD>@<SERVERNAME> <<EOF        }
@$table_name.sql                                  } 1860
EOF
```

```
CREATE TABLE NZ_DATA_VALIDATION(
TABLE_NAME VARCHAR2(100),
DML_OR CLOB,
DML_NZ CLOB);
```

2010

```
CREATE TABLE AUDIT_TABLE_DATA_COMPARE_ETL
(
TableName VARCHAR(100),
Status VARCHAR(20),
full_data_compare VARCHAR(2),
ora_row_count NUMERIC,
nz_row_count NUMERIC,
num_match VARCHAR(2),
data_match VARCHAR(2),
text_match VARCHAR(2),
Audit_date TIMESTAMP,
Message VARCHAR(9000)
);
```

```
SELECT distinct a1.subject_area,
a1.mapping_name,a1.parent_source_database_type,to_object_name as
SQ,a2.parent_source_name,from_object_name --        INSTR (UPPER (from_object_name), '_TQ_', 1, 1), to_object_name, --        decode(INSTR (UPPER (from_object_name), '_TQ_', 1, 1),9,SUBSTR
(from_object_name, --              INSTR (UPPER (from_object_name), '_TQ_', 1, 1) + 4, --              LENGTH (from_object_name)), --                 0,from_object_name

--  )

FROM Infarepo_ibk.rep_mapping_conn_ports a1,
  Infarepo_ibk.rep_all_sources a2
WHERE a1.subject_area||a1.mapping_name IN
         ('<SUBJECTNAME>||<MAPPINGNAME>' )
     and a1.from_object_id=a2.parent_source_id
--   and a2.parent_source_database_type=('Flat File')
     AND from_object_type_name = 'Source Definition'
```

2110

```
SELECT distinct
a1.subject_area
, a1.mapping_name
,parent_target_database_type
,a2.parent_target_name
,to_object_name
FROM
   INFAREPO_IBK.rep_mapping_conn_ports a1,
   Infarepo_ibk.rep_all_targets a2
WHERE a1.subject_area||a1.mapping_name IN
('<SUBJECTNAME>||<MAPPINGNAME>')
     and a1.to_object_id=a2.parent_target_id
     AND to_object_type_name = 'Target Definition'
```

```
SELECT DISTINCT d.subj_name subj_name, c.mapping_name MAP, b.widget_name,A.ATTR_VALUE as Lkp_Table_Name
        FROM InfaRepo_IBK.opb_widget_attr a,
             InfaRepo_IBK.opb_widget b,
             InfaRepo_IBK.opb_mapping c,
             InfaRepo_IBK.opb_subject d
        WHERE d.subj_id = c.subject_id
        and d.subj_name||c.mapping_name in ('<SUBJECTNAME>||<MAPPINGNAME>' )
          AND c.mapping_id = b.ru_parent_id
          AND b.is_visible <> 0
          AND b.widget_id = a.widget_id
          AND b.widget_type IN 11
          AND a.attr_id = 2
        ORDER BY d.subj_name, c.mapping_name, b.widget_name
```

2210

```
select  subj_name folder_name,a.MAP Mapping_name,
case when a.widget_type=3 then 'Source Qualifier' else 'Lookup' end Transformation_Type,
A.WN Transformation, replace(replace(xmlagg(xmlelement("x",a.STRVAL) order by
a.line_no).getClobVal(),'<x>'),'</x>') as override
  from (SELECT a.line_no,d.subj_name subj_name,c.mapping_name MAP, b.widget_name
WN,b.widget_type,REPLACE
            (REPLACE (a.attr_value, CHR (9), ' '), CHR (13) || CHR (10), ' ') STRVAL
    FROM pmpadmin.opb_widget_attr a, pmpadmin.opb_widget b, pmpadmin.opb_mapping c,
pmpadmin.opb_subject d
  WHERE
    d.subj_id = c.subject_id
    AND c.mapping_id = b.ru_parent_id
    AND b.is_visible <> 0
    AND b.widget_id = a.widget_id
    AND b.widget_type in (3,11)
    AND a.attr_id = 1
    order by a.line_no
) A
where a.STRVAL  is not null
group by a.subj_name,A.MAP, A.WN,a.widget_type
```

AUTOMATED DATA WAREHOUSE MIGRATION

FIELD

The present disclosure pertains to apparatus and methods for data analysis, migration, and validation involving electronic databases.

BACKGROUND

The proliferation of enterprise data is unceasing. Companies are seeing their volumes of enterprise data growing faster than ever before, and that data is coming from more sources than ever. As data volumes grow, analytics become more complex, users demand faster response times, and cost reduction initiatives become rampant. Traditional data warehouse users have simply been unable to keep up with these bottlenecks.

As part of this transformation, increased emphasis is placed on the consolidation, migration, and optimization of data warehouse (DW) database infrastructure. Data warehouse (DW) appliance vendors are deploying massively parallel architectures that take a different approach to data storage than traditional database architectures to eliminate the bottlenecks described above.

As applications that use complex queries and massive amounts of data storage have become increasingly prevalent, a shift from traditional RDBMS (Relational Database Management Systems) to data warehouse appliances is occurring. In particular, as Business Intelligence (BI) applications become more pervasive, use of data warehouse appliances (DWAs or DW appliances) is increasing in order to provide integrated, enterprise-wide data warehouses that assure scalability, query performance, and improved development and maintenance costs. Such DWAs integrate database, server, and storage in a single, easy-to-manage system. These DWAs also typically offer operating systems, DBMS (database management systems), and software tailored for a data warehouse environment using a massively parallel processing architecture to provide high performance and scalability.

Thus, as Business Intelligence emerges as a factor for strategic, tactical, and operational information users, access to information alone is no longer enough. Organizations are using BI to monitor, report, analyze, and improve the performance of business operations. Current business demands require processing large amounts of data to generate relevant analytical reports. As data volumes increase and query navigation becomes more sophisticated, it becomes challenging to provide adequate query performance for large volumes of data that meets response time service level agreements.

SUMMARY

Apparatus, computer-readable storage media, and methods are disclosed for allowing migration and validation of data from a source environment (such as an RDBMS system) to a target environment (such as a data warehouse appliance).

The described techniques and tools for improving migration and validation can be implemented separately, or in various combinations with each other. As will be described more fully below, the described techniques and tools can be implemented on hardware that includes a massively parallel processing infrastructure and massive amounts of data storage. As will be readily apparent to one of ordinary skill in the art, the disclosed technology can be implemented using, for example, data warehouse appliances provided by commercial vendors, such as Teradata (e.g., Teradata Data Warehouse Appliance 2650), Oracle (e.g., Oracle Exadata data warehouse appliance), and Netezza (e.g., Netezza TwinFin data warehouse appliance).

In some examples of the disclosed technology, a method of migrating data from a source database environment to a target database environment includes analyzing the source database environment and the target database environment to produce configuration data for generating a mapping for converting at least one table in a source database of the source database environment to a format compliant with a target database in the target database environment, generating a target-compliant mapping based on the configuration data, and migrating the table from the source database to the target database environment to produce migrated data in the target database environment, where the migrating is performed based at least in part on the target-compliant mapping.

In some examples a source database environment comprises a relational database management system and a target database environment comprises a data warehouse appliance. Some examples of the method include searching the source database environment for structured query language (SQL) statements and based on the SQL statements and the target-compliant mapping, generating SQL statements compliant with a target database environment.

In some examples, a method includes analyzing data by extracting one or more column lists from the source database environment, generating one or more SQL statements based on the extracted column lists, generating an SQL script with translation functions and conversion functions based on the generated SQL statements; and migrating data by executing the SQL script in the target database environment.

In some examples, a method includes persisting output of a target database environment script in a computer-readable storage device and based on the persisted output, repeating data migration, wherein at least one table based on the persisted output to be migrated during the repeated data migration.

Some examples include validating migrated data using one or more sets of computer-executable instructions being generated based at least in part on configuration data or one or more target-compliant mappings.

Some examples include extracting at least one or more of the following from the source database environment: a column list, data associated with a column list, a date range, or a validation criteria list, generating a target-compliant mapping including mapping one or more validation SQL statements based on the extracted data; and migrating data includes executing validation SQL statements in the target database environment.

Some examples include storing at least a portion of migrated data in a computer-readable storage medium.

In some examples, a target-compliant mapping includes mappings for converting at least one or more of the following to a form compliant with the target environment: DB-specific functions, custom SQL usage patterns, custom target loads, DB-specific join syntax, reserved syntax, DB constraints, datatypes, or DDL code.

Some examples include one or more computer-readable media storing computer-readable instructions that when executed by a computer, cause the computer to perform one or more of the method disclosed herein.

In some examples of the disclosed technology, a method of migrating source extraction, transformation, and loading (ETL) code from a source environment to a target environment as target ETL code compliant with the target environment, the method comprising analyzing the source ETL code and the source environment to produce a conversion inventory; and converting at least a portion of the source ETL code to the target ETL code using at least one mapping from the source environment to target environment, where the mapping is based on the conversion inventory, and where at least a portion of the target ETL code is executable in the target database environment.

In some examples, the source ETL code includes tool-based ETL code. In some examples, the source ETL code includes script-based ETL code, database-based ETL code, or script-based ETL code and database-based ETL code.

In some examples, converting source ETL code includes generating one or more input files for SQL statement conversion using input files generated based on at least one or more of the following: datatype usage patterns in the source database environment, database-specific function usage patterns in the source database environment, or custom SQL statement usage patterns in the source environment, and executing SQL statement conversion code in the target environment, the SQL statement conversion code being based on the input files for SQL statement conversion.

In some examples executing SQL statement conversion code includes at least one or more of the following conversions: converting database-specific join syntax to American National Standards Institute (ANSI)-standard join conventions, converting inline outer join queries to set queries, or converting syntax and/or keywords that are reserved in the target environment to a target environment-specific syntax.

In some examples, a method includes generating XML data describing a mapping of source ETL code to the target database environment, exporting XML data to the target environment, searching and replacing one or more tags from the source environment with target environment-specific metadata tags in the target environment, replacing source database-specific SQL source system properties with target database-specific SQL source system properties in the target environment, and compiling and validating the target ETL code in the target environment, where the compiling and the validating is based at least in part on the XML data.

In some examples, a method includes persisting output of a script for the converting ETL source code in a computer-readable storage device, and based on the persisted output, repeating the migrating, wherein a table is migrated to the target environment based on the persisted output.

In some examples, a method includes generating validation SQL code for validating the target environment based on a criteria list and/or a date range, the validation SQL being executable in the target environment to validate at least a portion of the target ETL source code.

In some examples, a method includes mappings for at least one or more of the following: DB-specific functions, custom SQL code, custom target load techniques, DB-specific syntax, datatypes, metadata tags, or extraction SQL code.

In some examples, a method includes a mapping based on mapping XML code generated based on a target ETL dictionary.

In some examples of the disclosed technology, a system for migrating a source database environment including a source database and source ETL to a target environment including a data warehouse appliance includes a computer-implemented database analysis workbench for analyzing the source database environment and the target environment to produce configuration data for migrating data from the source database environment to the data warehouse appliance, a computer-implemented database migration workbench for migrating at least a portion of the data from the source database environment to the data warehouse appliance using one or more mappings based at least in part on the configuration data, and a computer-implemented database quality assurance workbench for validating data migrated to the data warehouse appliance by the database migration workbench.

In some examples, a system includes a computer-implemented ETL analysis workbench for analyzing the source database environment and the target environment to produce ETL configuration data for migrating at least a portion of the source ETL code from the source database environment to the target database environment, a computer-implemented ETL migration workbench for migrating at least a portion of the data from the source ETL code to the target database environment using one or more mappings based at least in part on the ETL configuration data, and a computer-implemented ETL quality assurance workbench for validating ETL code migrated to the data warehouse appliance by the ETL migration workbench.

In some examples of the disclosed technology, a system for migrating data from a source environment to a target environment includes means for analyzing the source environment and the target environment to produce configuration data for generating one or more mappings for data in the source environment to the target environment and means for migrating at least a portion of the data to the target environment, where the migrating is performed based at least in part on the mappings generated using the configuration data, to produce migrated data in the target environment.

In some examples, a system includes means for analyzing include means for analyzing data stored in a source database in the source environment and means for migrating include means for migrating data from the source database to a target database in the target environment.

In some examples, a system includes means for analyzing ETL data stored in a source environment and means for migrating ETL data from the source environment to the target environment.

In some examples, a system includes means for validating at least a portion of the migrated data.

In some examples, a system includes means for validating at least a portion of the migrated data to produce validation data and means for repeating the analyzing and the migrating, wherein the analyzing and the migrating are based at least in part on the validation data.

The foregoing and other objects, features, and advantages of the invention will become more apparent from the following detailed description, which proceeds with reference to the accompanying figures.

BRIEF DESCRIPTION OF THE DRAWINGS

FIG. 15 is a table illustrating exemplary commercially-available source environments that can be converted to a target environment (e.g., a DW appliance) using apparatus, methods, and computer-readable storage media disclosed herein.

FIG. 16 is a listing of example portions of Perl source code that can be used in some examples of the disclosed technology.

FIG. 17 is a listing of example SQL code for migrating dynamically created SELECT statements that can be used in some examples of the disclosed technology.

FIGS. 18A-18C are listings of example source code for performing data migration that can be used in some examples of the disclosed technology.

FIG. 19 is an example migration report that can be produced using some examples of the disclosed technology.

FIG. 20 includes two listings of example ANSI SQL code for a migrated table produced in some examples of the disclosed technology.

FIG. 21 includes two source code listings of database queries that can be used in analysis of source and target environments.

FIG. 22 includes two source code listings for analysis of lookup tables available in a source environment.

DETAILED DESCRIPTION

Figure 1:
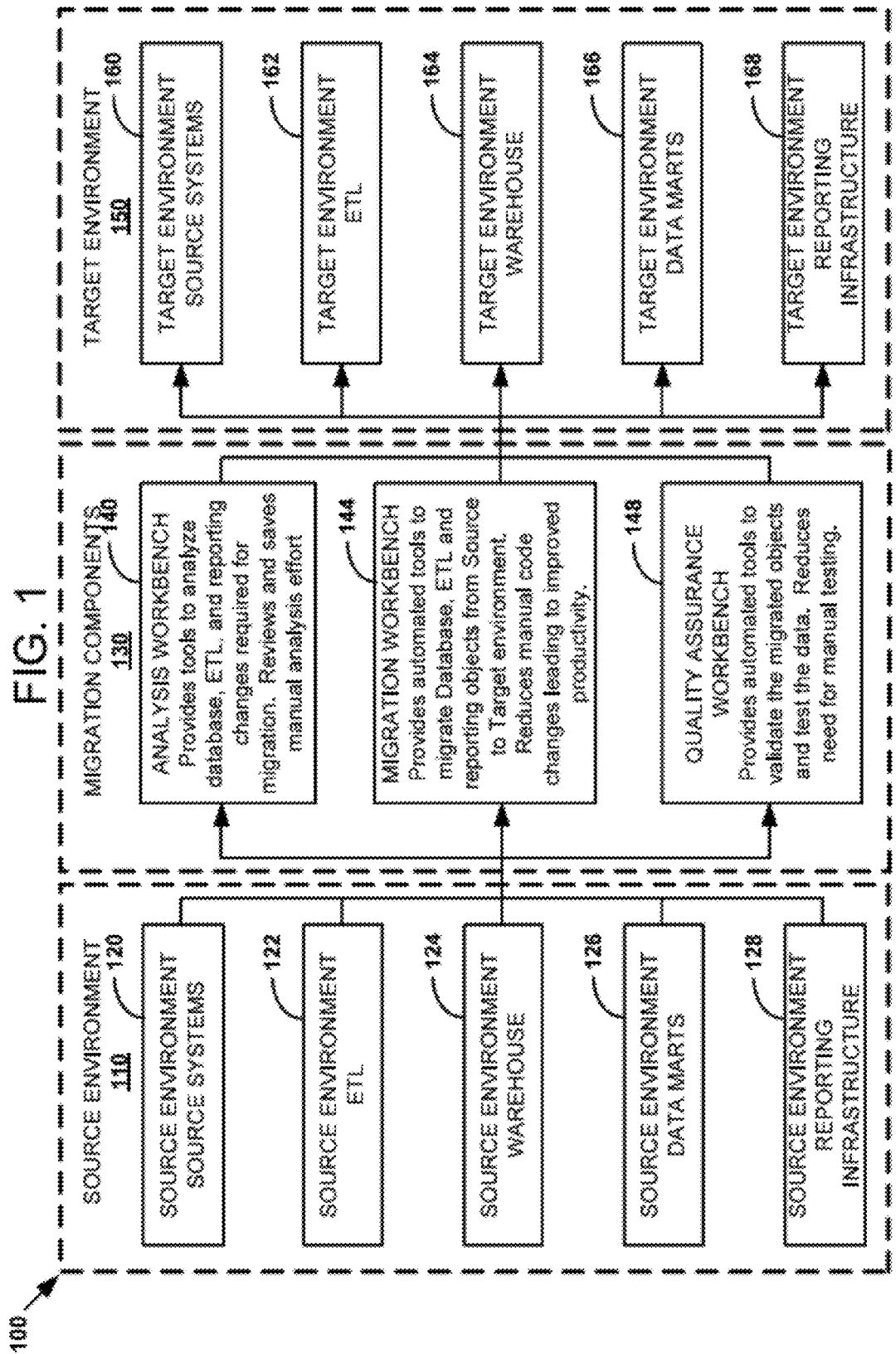
FIG. 1 is a block diagram illustrating components of an exemplary system for migrating data from a source environment (e.g., an RDBMS-based system) to a target environment (e.g., a data warehouse platform).

This disclosure is set forth in the context of representative embodiments that are not intended to be limiting in any way.

As used in this application and in the claims, the singular forms "a," "an," and "the" include the plural forms unless the context clearly dictates otherwise. Additionally, the term "includes" means "comprises."

The systems, methods, and apparatus disclosed herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Furthermore, any features or aspects of the disclosed embodiments can be used in various combinations and sub-combinations with one another. Furthermore, as used herein, the term "and/or" means any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged, omitted, or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce," "generate," "select," "search," and "provide" to describe the disclosed methods. These terms are high-level abstractions of the actual operations that are performed. The actual operations that correspond to these terms can vary depending on the particular implementation and are readily discernible by one of ordinary skill in the art.

Any of the disclosed methods can be implemented as computer-executable instructions stored on one or more computer-readable storage media (e.g., non-transitory computer-readable media, such as one or more volatile memory components (such as DRAM or SRAM), or nonvolatile memory components (such as hard drives) and executed on a computer (e.g., any suitable computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in sh, ksh, C, C++, Java, Perl, Python, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including radio frequency (RF, microwave, and infrared communications), electronic communications, or other such communication means.

Theories of operation, scientific principles, or other theoretical descriptions presented herein in reference to the systems, methods, and apparatus of this disclosure have been provided for the purposes of better understanding and are not intended to be limiting in scope. The systems, methods, and apparatus in the appended claims are not limited to those systems, methods, and apparatus that function in the manner described by such theories of operation.

As used herein, and as would be readily understood to one of ordinary skill in the art, the term "ETL" refers to Extraction, Transformation, and Loading. "RDBMS" refers to a relational database management system. "DW" refers to a data warehouse, for example, a data warehouse appliance or a data warehouse platform. "DDL" refers to a data definition language. "SQL" refers to a structured query language for submitting queries to a database. SQL statements and SQL code refer to queries written in a structured query language, and do not necessarily require SQL written in a particular syntax or for a particular database. "XML" refers to an extended markup language.

As used herein, the term "script" refers to executable source code written in, for example, sh, bash, ksh, tcsh, csh, awk, sed, Perl, Python, or other suitable scripting languages. However, as will be readily understood by one of ordinary skill in the art, such scripts can be augmented or replaced by computer-executable instructions produced using other techniques, such as other compiled languages (e.g., C, C++, or Java) or interpreted computer programming languages (e.g., LISP, Ruby). Thus, use of the term "script" herein is not limited to traditional scripting languages, but includes any computer-executable instructions for performing the disclosed functionality, regardless of programming methodology.

Unless explicitly stated otherwise, the terms "source environment" and "target environment" refer to a "source database environment" and a "target database environment," respectively. Thus, as used herein, the terms "source environment" and "target environment" imply computing environments comprising at least one database, respectively. Further, as used herein the term "database" is used in a general sense, and includes not only traditional databases but also other forms for storing and accessing data, for example, data warehouses and data marts unless explicitly stated otherwise.

The disclosed technology provides a migration solution for migrating data from one or more types of RDBMS to one or more types of DW appliances. As discussed further herein, this can include RDBMS and/or DW analysis, migration tools and flows, and/or robust testing facilities.

The disclosed technology is compatible with a hybrid- or forklift-based approach to realize the value associated with investment around a DW appliance. Such a factory-based migration approach aligns with principles of DW appliance operation, maintenance, and management, and accelerates various stages of migration life cycle.

FIG. 1 is a block diagram 100 that depicts a generalized example of a source environment 110 to target environment 150 migration flow that uses a number of migration components 130. For example, a source RDBMS environment can be migrated to a target DW appliance. As shown, source environment 110 data can be stored in one or more source systems 120 (e.g., relational databases or other suitable databases) or as files. Also included in the source environment 110 are one or more data warehouses 124, one or more data marts 126, and reporting infrastructure 128. Many relational databases also include an ETL component 122 for efficiently extracting, transforming, and/or loading data stored in the source systems 120, data warehouses 124, or data marts 126. In some examples, the data warehouse 124 is a system that is used to collect and store data (e.g., transactional data, purchase data, or other suitable data) in a central data location, and that can be used to generate reports, such as aggregated reports on the data. In some examples, the data mart 126 is the access layer of a data warehouse environment that is used to get data out to the users. In some examples, the data marts are customized to a specific business process or team. In some examples, the data reporting infrastructure 128 includes reports, scripts, and queries for generating reports based on the data stored in the data warehouses 124.

Also shown in FIG. 1 are several migration components 130 of a migration solution. An analysis workbench 140 provides tools to analyze databases, to analyze ETL code, and to report changes required for migration from the source environment 110 (e.g., an RDBMS-based system) to the target environment 150 (e.g., a Data Warehouse platform). A migration workbench 144 provides automated tools for migrating database, ETL, and reporting objects from the source environment to the target environment. A quality assurance workbench 148 provides automated tools to validate migrated data and test the migrated data, thereby reducing the need for manual testing. Details regarding the functionality and implementation of the migration components 130 are discussed further below.

A target environment 150 can include several components similar to those of the source environment 110. For example, target environment 150 can store data in one or more target source systems 160, and can include a target ETL component 162 for efficiently extracting, transforming, and/or loading data stored in the target source systems 160, data warehouses 164, or data marts 166. Also shown in the target environment 150 are one or more data warehouses 164, one or more data marts 166, and reporting infrastructure 168, that can have similar functionality to that described for the components of the source environment 110.

Figure 2:
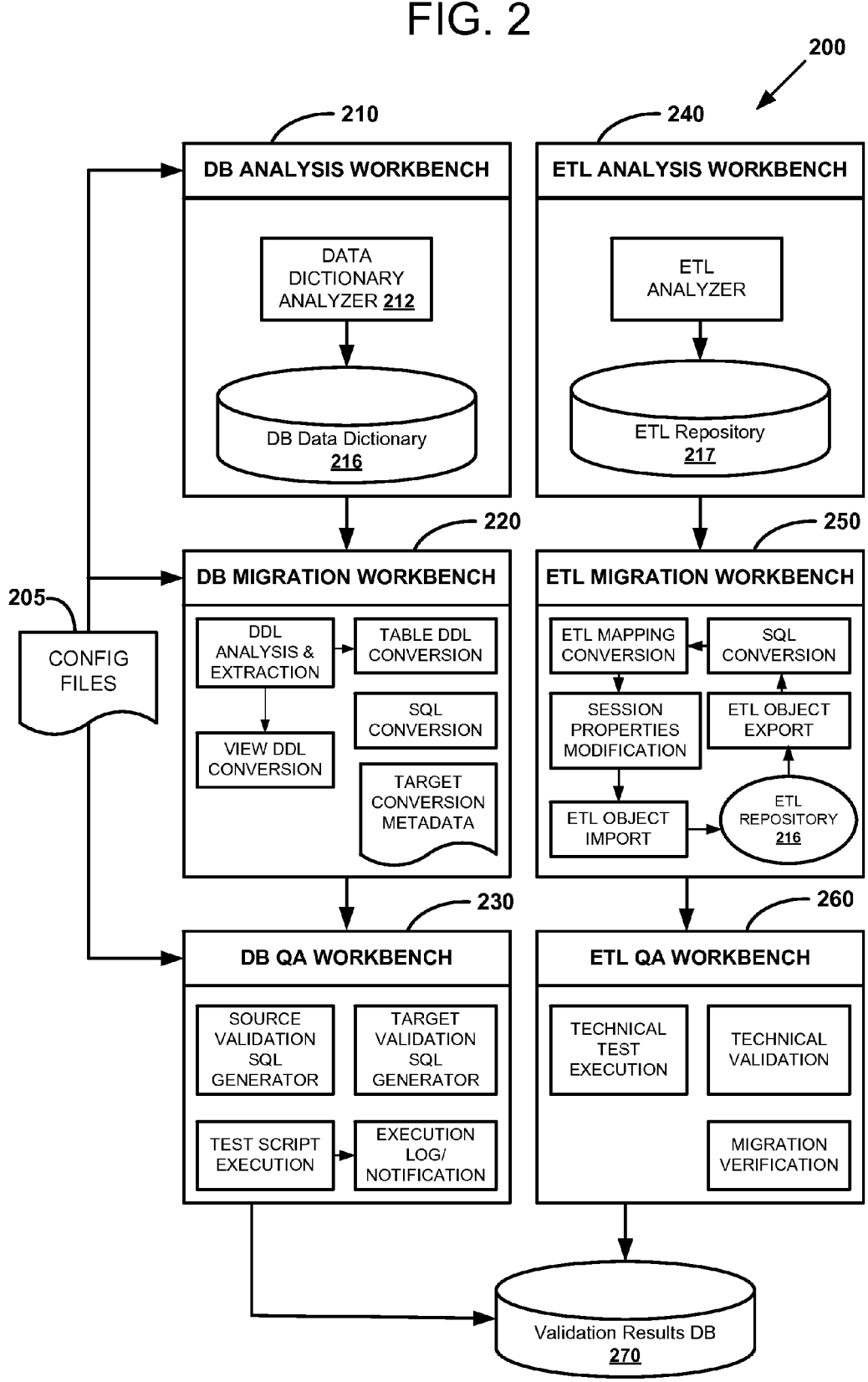
FIG. 2 is a block diagram illustrating components of an exemplary system for migrating data from a source environment (e.g., an RDBMS-based system) to a target environment (e.g., a data warehouse platform).

FIG. 2 is a block diagram 200 that depicts a system architecture for exemplary database migration and ETL migration components. This includes a database (DB) analysis workbench 210, DB migration workbench 220, and DB quality assurance workbench 230 for the database portion of the migration flow, as well as an ETL analysis workbench 240, ETL migration workbench 250, and ETL quality assurance workbench 260 for the ETL portion of the migration flow. As shown, a number of configuration files 205 are used to define source and target information and control the overall operation of the database and ETL migration flows.

Both the database workbenches 210, 220, and 230 and the ETL workbenches 240, 250, and 260 include a number of toolsets as described herein to accelerate the migration process, thereby providing an integrated solution for migration of components of DB objects, ETL objects, and for providing end-to-end validation. In some examples, the components can be at least partially metadata-driven based on metadata that has been, for example, stored in databases, ETL repositories, and/or the configuration files.

Also shown in FIG. 2 is a DB data dictionary 216, which can be used as a knowledge bank to maintain details for a target DW appliance as part of the database analysis workbench 210. Information stored in the DB data dictionary 216 can include properties such as data type, syntaxes, functions, other physical properties, or other suitable properties for a target DW Appliance. Data representing differences of the included properties of the source environment (e.g., source databases) relative to other databases (e.g., target databases) can also be included. A data dictionary analyzer 212 is employed to analyze the source environment, including, for example, source systems 120, source ETL 122, source data warehouse(s) 124, data mart(s) 126, and source reporting infrastructure 128. Data based on this analysis can then be stored in the DB data dictionary 216.

A DB migration workbench 220 provides migration functionality, including DDL extraction, analysis, and conversion, SQL conversion. The DB migration workbench 220 can be guided at least in part using target conversion metadata, as shown.

A DB quality assurance (QA) workbench 230 provides functionality for validating data during the migration process. As shown, the DB QA workbench 230 includes functionality for validating source and target SQL, as well as for executing test scripts and generating data (e.g., in log files) and notifying users of the migration status and validation results. As shown, validation results from the database migration workbenches 210, 220, and 230 can be stored in a validation results database 270.

Also shown in FIG. 2 are ETL workbenches 240, 250, and 260 for analysis, migration, and validation of migrated ETL data.

In some examples, details for ETL migration can be generated by an ETL analyzer and stored and maintained in an ETL repository 217 that can be adopted in a target environment using, for example, standardized sets of ETL tool-based scripts or database-specific ETL scripts. Thus, the ETL repository 217 can be used as a knowledge bank that can maintain data representing differences between ETL processes of two distinct databases (e.g., differences between a source environment and a target environment). Examples of differences that can be stored in the ETL repository 217 can include, for example, usage of an application source qualifier vs. a normal source qualifier, usage of enterprise stages vs. ODBC-based stages, or other suitable differences for ETL migration.

An ETL migration workbench 250 provides functionality for migrating ETL data from a source to a target environment. As shown, an iterative flow is used to map ETL data from a source environment to a target environment, which includes modification of source properties and importation of ETL objects into the target environment. As shown, information regarding the ETL migration and analysis can be stored in an ETL repository, for use in exporting ETL objects and conversion of SQL data.

An ETL quality assurance workbench 260 provides a number of tools for executing technical tests for ETL conversion, executing validation of the ETL conversion, and verification of ETL migration. As shown, data reporting results of ETL migration can be stored in the validation results database 270.

As shown, standard toolsets offered within the source and target environments, including source/target database, source/target ETL and/or source/target operating systems (OS) can be used for automation. Other components of the architecture include functionality for providing configuration features to simplify adoption, automated data validation, functional balancing, and notification features. An efficient logging process can be employed to provide transparency of migration functionality and to maintain validation history and functional balancing results, using, for example, a validation results database 270.

Thus, the system architecture in the block diagram 200 provides transparency through an efficient logging process to maintain history data of validation and functional balancing results in a database.

Individual methods and apparatus of the database workbenches 210, 220, and 230 and ETL workbenches 240, 250, and 260 are discussed in further detail below.

Example Database Migration

Figure 3:
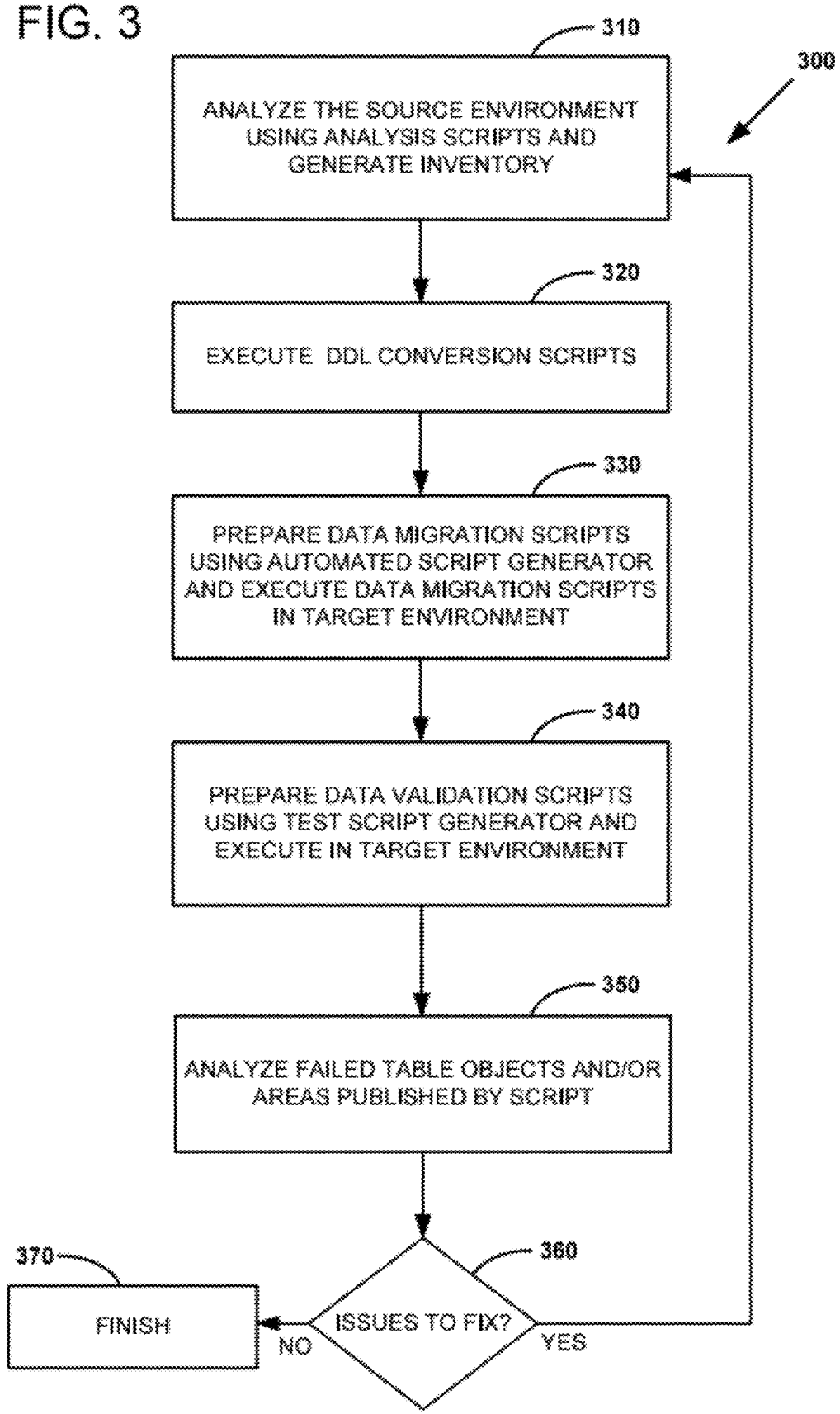
FIG. 3 is a flow chart that outlines an exemplary method of migrating components of a source environment to a target environment.

FIG. 3 is a flow chart 300 that outlines an exemplary method of database component migration from a source environment (for example, an RDBMS or DW environment) to a target environment (e.g., an RDBMS or DW environment). For example, the DB analysis workbench 210, DB migration workbench 220, and DB quality assurance workbench 230 depicted in FIG. 2 are high-level examples of a suitable system for performing ETL migration.

At process block 310, the existing database(s), data warehouse(s), and/or data mart(s) are analyzed using analysis scripts to produce a finalized inventory for the source environment.

At process block 320, conversion scripts for converting DDL from source formats to target formats are executed, producing converted DDL data.

At process block 330, data migration scripts are generated using an automated script generator. In this example, a script generator is executed in the target environment.

At process block 340, data validation scripts for validating migrated data are generated using an automated script generator. In this example, the script generator is executed in the target DW environment.

At process block 350, data representing failed table objects, failed table area, and other migration errors, warnings, and/or issues are reported and analyzed. Thus, an automated approach as depicted in FIG. 3 allows rapid deployment of a database component migration with a high degree of quality.

At process block 360, the data reported and analyzed at process block 350 is checked to determine whether there are remaining issues in the migration to fix. If so, the method proceeds to process block 310, where input data and configuration files can be updated, and one or more of process blocks 320, 330, 340, and/or 350 can be re-run. As will be described in more detail below, the method need not be performed for all data to be migrated, but instead the flow is re-run for a selected amount of data (for example, one or more selected tables). Further, other criteria (e.g., date criteria) can also be used to determine which data or method acts are performed during the re-run, as will be described in further detail below.

If no issues remain to be fixed, the method proceeds to process block 370, and the migration is complete.

Figure 24:
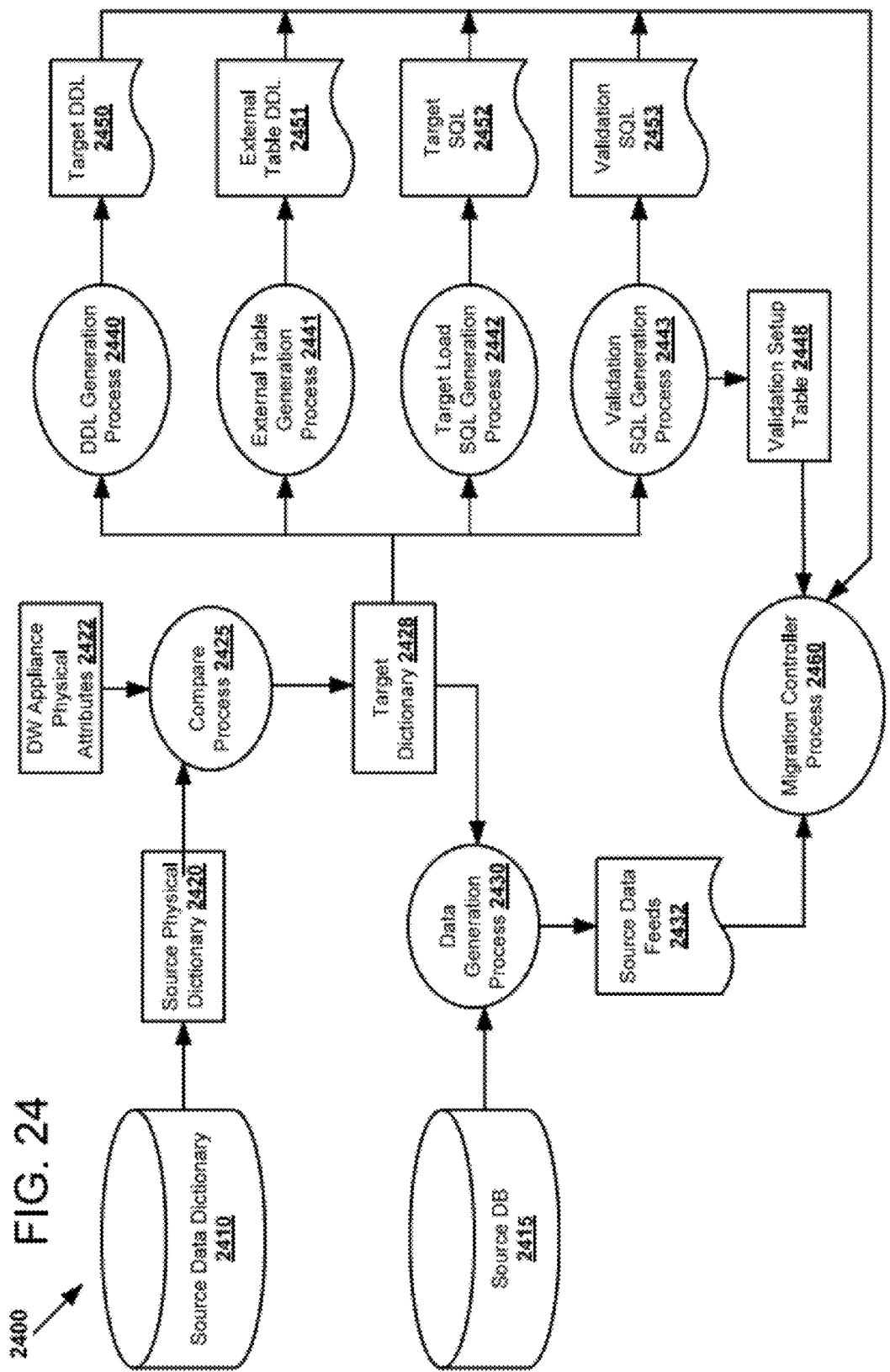
FIG. 24 is a flow diagram illustrating an example data flow used in some implementations of a data migration flow.

FIG. 24 is a flow diagram 2400 illustrating an example data flow used in some implementations of the example method depicted in FIG. 3 and FIGS. 4-7 (which are described in more detail below).

As shown, data from a source data dictionary database 2410 is read to produce a source physical dictionary 2420, which can be stored as, for example, a file. Also shown is a DW appliance physical attributes dictionary 2422, which describes physical attributes of the target environment, and which can also be stored as, for example, a file. As shown, a compare process 2425 is used to compare the source physical dictionary 2420 to a DW appliance physical attributes dictionary 2422 and produce a target dictionary 2428, which is used by a number of data migration processes 2440-2443 as input files and configuration data for performing data migration. In some examples, the target dictionary 2428 includes mappings for a number of properties and/or tables in the source environment to the target environment. The target dictionary 2428 can include information describing mapping computing resources, database tables, and rules for conversion of DDL, external tables, target load SQL, and validation SQL from the source environment to the target environment. Thus, the data flow concerning the compare process 2425 corresponds to migration analysis that can be performed in some implementations of process block 310.

As shown, a number of data migration processes 2440-2443 use the target dictionary 2428 in performing data migration. For example, DDL generation process 2440 uses the target dictionary 2428 to produce migrated target DDL code 2450. Thus, DDL generation process 2440 corresponds to DDL migration that can be performed in some implementations of process block 320 and some implementations depicted in the flow chart 500, which is described in further detail below. Similarly, external table generation process 2441 uses the target dictionary 2428 to produce migrated external table DDL 2451 that can be performed in some implementations of process block 320 and some implementations depicted in the flow chart 500, which is described in further detail below.

Also shown is a target load SQL generation process 2442, which uses the target dictionary 2428 to produce target SQL 2452. Thus, target load SQL generation process 2442 corresponds to SQL generation that can be performed in some implementations of process block 330 and some implementations depicted in the flow chart 600, which is described in further detail below.

Also shown is a validation SQL generation process 2443, which uses the target data dictionary 2428 to produce validation SQL 2453. In addition, the validation SQL generation process 2443 produces validation setup table(s) 2448 that can be used during migration validation. Thus, the validation SQL generation process 2443 corresponds to validation SQL generation that can be performed in some implementations of process block 340 and some implementations depicted in the flow chart 700, which is described in further detail below.

Also shown is a data generation process 2430 that reads data from a source database 2415 of the source environment and produces source data feeds 2432 that are used to migrate data to a target database in the target environment. Thus, the data generation process 2430 corresponds to data migration that can be performed in some implementations of process block 330 and some implementations depicted in flow chart 600, which is described in further detail below.

Also shown is a migration controller process 2460. The migration controller process 2460 can be used to control the execution of various processes during data migration and validation, for example compare process 2425, data generation process 2430, and generation processes 2440-2443. As shown, the migration control process 2460 receives data that includes the source data feeds 2432, validation setup table 2448, and migrated data such as target DDL 2450, external table DDL 2451, target SQL 2452, and validation SQL 2453. Thus, the migration controller process 2460 can control all or a portion of the example method depicted in the flow chart 300 of FIG. 3.

Figure 4:
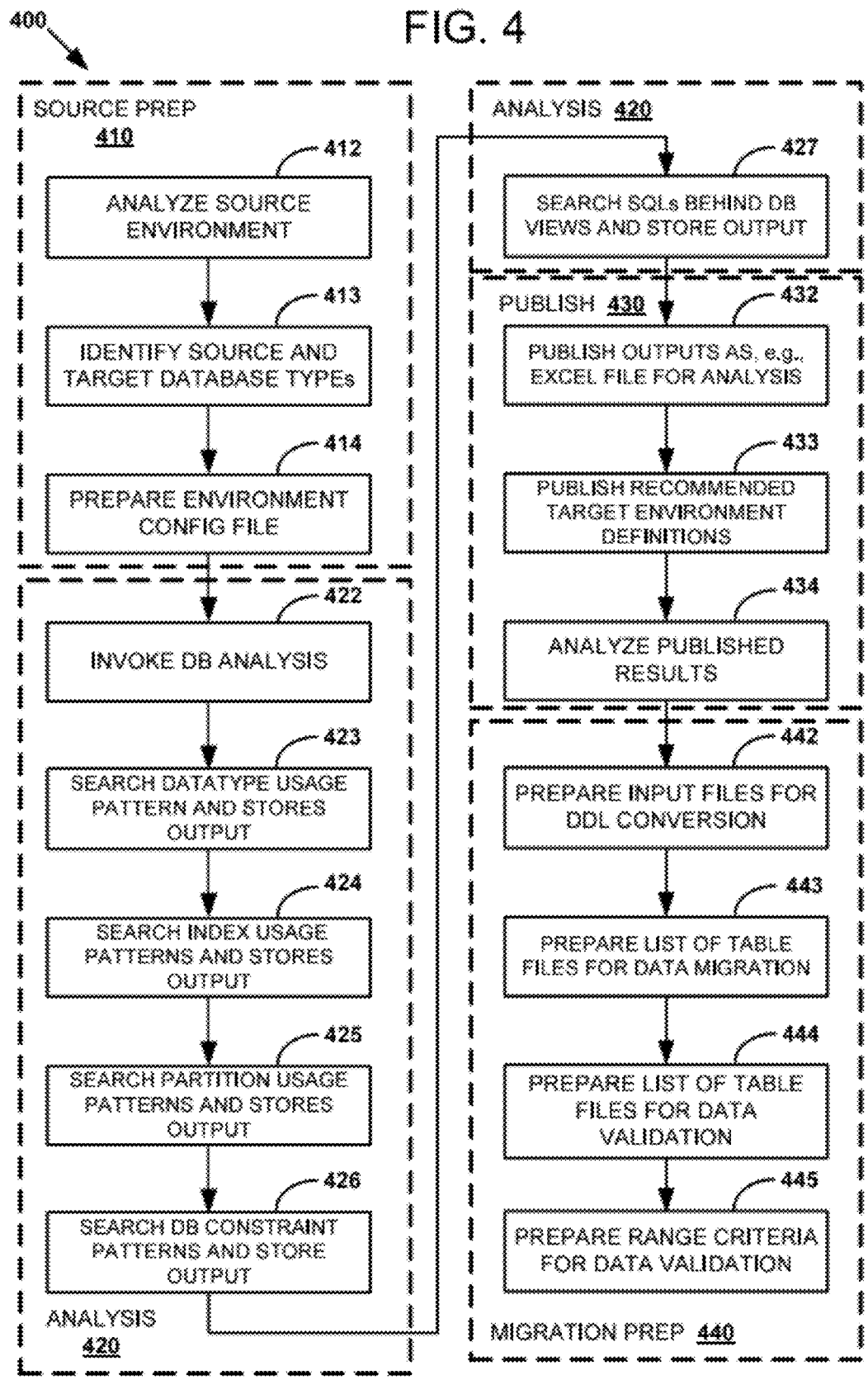
FIG. 4 is a flow chart further detailing an example implementation of the method of FIG. 3, including analysis of a database component.

FIG. 4 is a flow chart 400 further illustrating implementations of the exemplary method depicted in FIG. 3, including source environment analysis and inventory generation performed at process block 310. As shown, during a preparation phase 410, the existing source environment is analyzed 412 and source and target database types are identified 413, producing environment configuration data 414. The configuration data can include, for example, environment information such as domain names, server names, user names, or passwords. In some examples, the configuration file can also include references to metadata used during DB migration and references to particular mapping code and/or scripts to be used for mapping the source environment to the target environment during the DB migration flow.

During an analysis phase 420, database analysis is invoked (e.g., by invoking a database analysis script) which uses the configuration data produced at process block 414 to search the source environment for: datatype usage patterns (process block 423), index usage patterns (process block 424), partition usage patterns (process block 425), database constraint patterns (process block 426), and source SQL data (process block 427). Thus, a detailed analysis of database objects to be migrated is obtained.

During a publish phase 430, output from the analysis phase 420, including output produced at process blocks 422-427, can be stored as, for example, a Microsoft® Excel file, or other suitable format, at process block 432. Recommendations for the target environment (at process block 433) and analysis results (at process block 434) can also be published using, for example, a database analysis script.

During a migration prep phase 440, a number of input files are prepared for generating target-compliant mappings and performing data migration based on results from the analysis phase 420. As shown, input file(s) are prepared for DDL conversion at process block 442, a list of table files for data migration are prepared at process block 443, a list of table files for data validation are prepared at process block 444. At process block 445, range criteria for data validation are prepared. The range criteria specify parameters for performing migration data validation, and can include name of source or target database, date ranges when the data was last migrated, or other suitable ranges. By providing specific range criteria, data validation can be focused on those areas of the source data that have most recently been migrated, instead of performing data validation for all migrated date.

By using the DB analysis workbench 210 for preparing data migration, as shown in FIG. 4, the pre-built knowledge bank (e.g., including a DB data dictionary 216) for multiple databases can be leveraged to search for different patterns of source database specific properties in the source database catalog through system database SQLs, and to identify source properties that are not compliant with the target environment. Examples of non-compliant properties include: data type not supported, data type precisions, indices, partitions, constraints, or other non-compliant properties.

The DB analysis workbench 210 can also include pre-built functions for identifying data value ranges and formats of the number and date type columns. Thus, the DB analysis workbench can search and identify the columns that have whitespace and/or other special characters so that incompatibilities with the target environment can be addressed.

Figure 5:
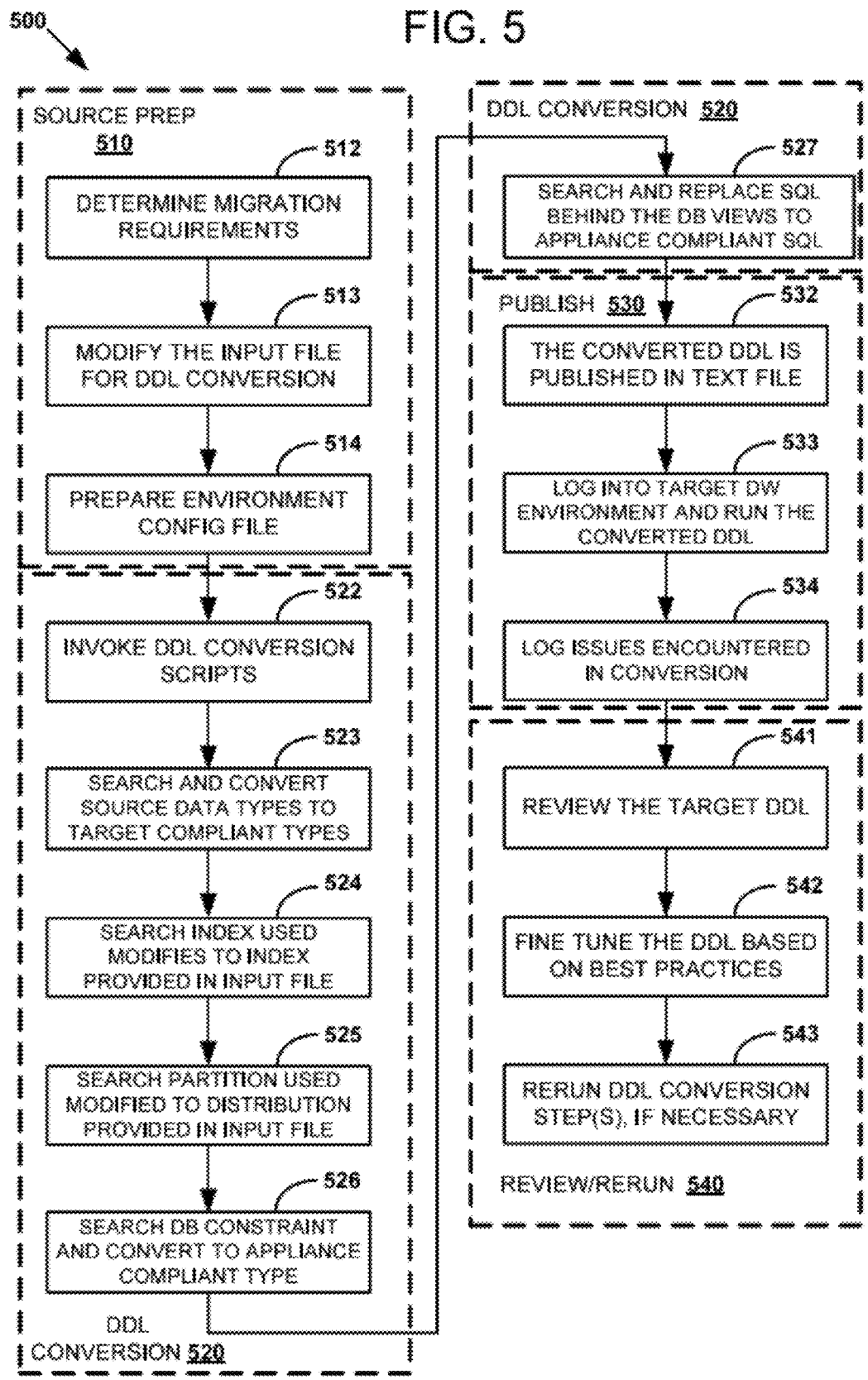
FIG. 5 is a flow chart further detailing an example implementation of the method of FIG. 3, including conversion of DDL (data description language) data from a source environment (e.g., an RDBMS-based system) to a target environment (e.g., a Data Warehouse platform).

FIG. 5 is a flow chart 500 further illustrating DDL conversion techniques that can be performed in some implementations of the exemplary method depicted in FIG. 3, including techniques performed at process block 320. As shown, the existing source environment is analyzed during a source preparation phase 510 to understand migration requirements (at process block 512), input files are modified for DDL conversion (at process block 513), and configuration data is generated for DDL conversion (at process block 514). The configuration data can include environment information, references to lists of tables, references to metadata used to drive the DDL conversion, and other information used to generate mappings between the source environment and the target environment.

Figure 17:
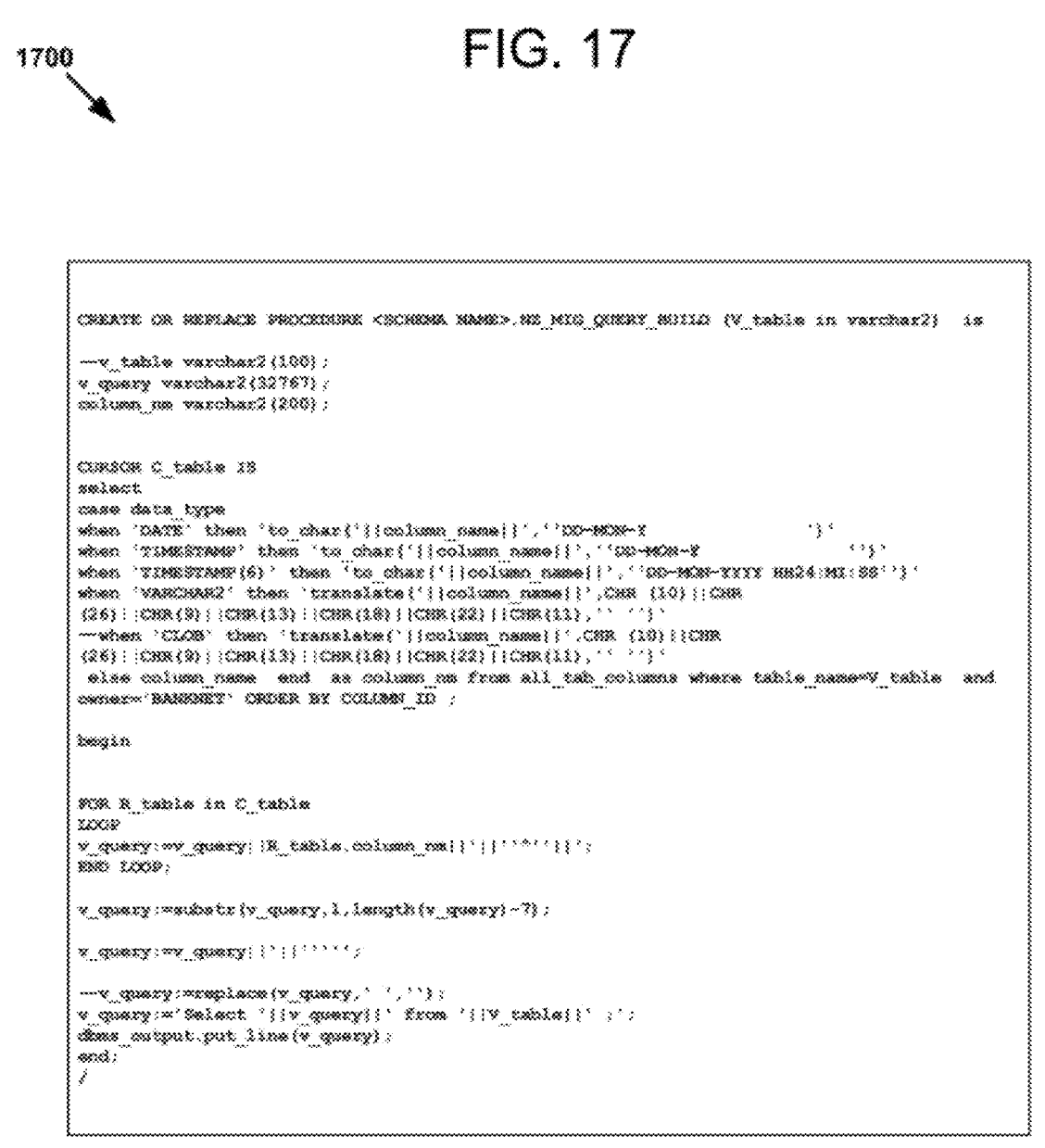

During a DDL conversion phase 520, DDL conversion scripts are invoked (at process block 522). After invoking the DDL conversion script, DDL data in the source environment is searched (at process block 523), and based on the configuration data produced at process block 514, converted DDL information is produced by converting source data types to target-compliant types (at process block 523), converting source indexes to target indexes (at process block 524), DDL data is converted from source partitions to target partitions (at process block 525), database constraints are converted to constraints compliant with target environment constraints (at process block 526), and source SQLs code is converted to SQL compliant with the target environment (at process block 527). An exemplary SQL script 1700 for migrating dynamically created SELECT statements from the source environment to the target environment is shown at FIG. 17. Other such scripts can be generated to migrate other statements. Thus, DDL data specific to the target environment can be obtained by generating a target-compliant mapping based on the configuration data, along with appropriate distribution keys.

During publish phase 530, converted DDL is published and errors and/or warnings are written to log files. For example, at process block 532, the converted DDL script can be published as a text file. The converted DDL is then executed in the target environment (at process block 533), and issues, such as warnings or errors, are logged (at process block 534).

During the review phase 540, the target DDL information can be reviewed (at process block 541), and the configuration files and/or conversion scripts adjusted as needed (at process block 542) to improve the DDL migration results. In some examples, the configuration and/or conversion scripts are updated manually, while in other examples, at least a portion of the updating can be performed automatically using a computer. If DDL migration results can be improved (for example, by changes to the environment configuration file produced at process block 514, changes to the DDL conversion scripts invoked at process block 522, or through other suitable changes in the DDL conversion environment), all or a portion of the method illustrated in FIG. 5 can be re-run (e.g., at process block 543) in order to improve DDL conversion results.

DDL conversion tools can leverage pre-built metadata (e.g., stored in a file) including identification of multiple source and/or target databases to search, and replace the input patterns of source environment database-specific properties with target environment appliance-specific properties, for example: data types, data type precisions, indices, distribution keys, partitions, constraints, or other suitable properties that are compliant with the target appliance. The DDL Conversion tool can also modify syntax of the DDL to be target-appliance specific, and also remove non-supported syntax from the source DDL scripts.

FIG. 16 is an example source code listing 1600 of portions of a Perl script that can be used to perform a portion of DDL conversion from an Oracle-based source environment to a Netezza-based target environment (including a DW appliance). As shown, a number of conversions mapping DDL from Oracle "number" format to Netezza "NUMERIC" format, and Oracle "float" format to Netezza "FLOAT" formats, are handled by source code 1610 for by applying Perl regular expressions to a built-in special variable, which contains the current line of the PF file handle. Other appropriate data types, such as char, varchar2, timestamp, byte, or other suitable data types can also be converted. Other DB objects, such as views, synonyms, and procedures can also be created for the target environment. Also shown is source code 1620 for converting a number of number data types from Oracle to the appropriate keyword in the Netezza environment. Further, a number of words that collide with specific Netezza reserved keywords can also be renamed, for example, the reserved word "ABORT" in a source DDL script is renamed to "ABORT 1" in the corresponding target DDL script in the target environment, as shown by the exemplary source code 1630. In addition, a number of constraints, Oracle options, and foreign keys can be commented out in the corresponding target DDL script using additional source code 1640. For clarity, only a subset of the conversion code used in a complete Oracle to Netezza DDL conversion is shown in the exemplary source code 1610, 1620, 1630, and 1640.

Figure 6:
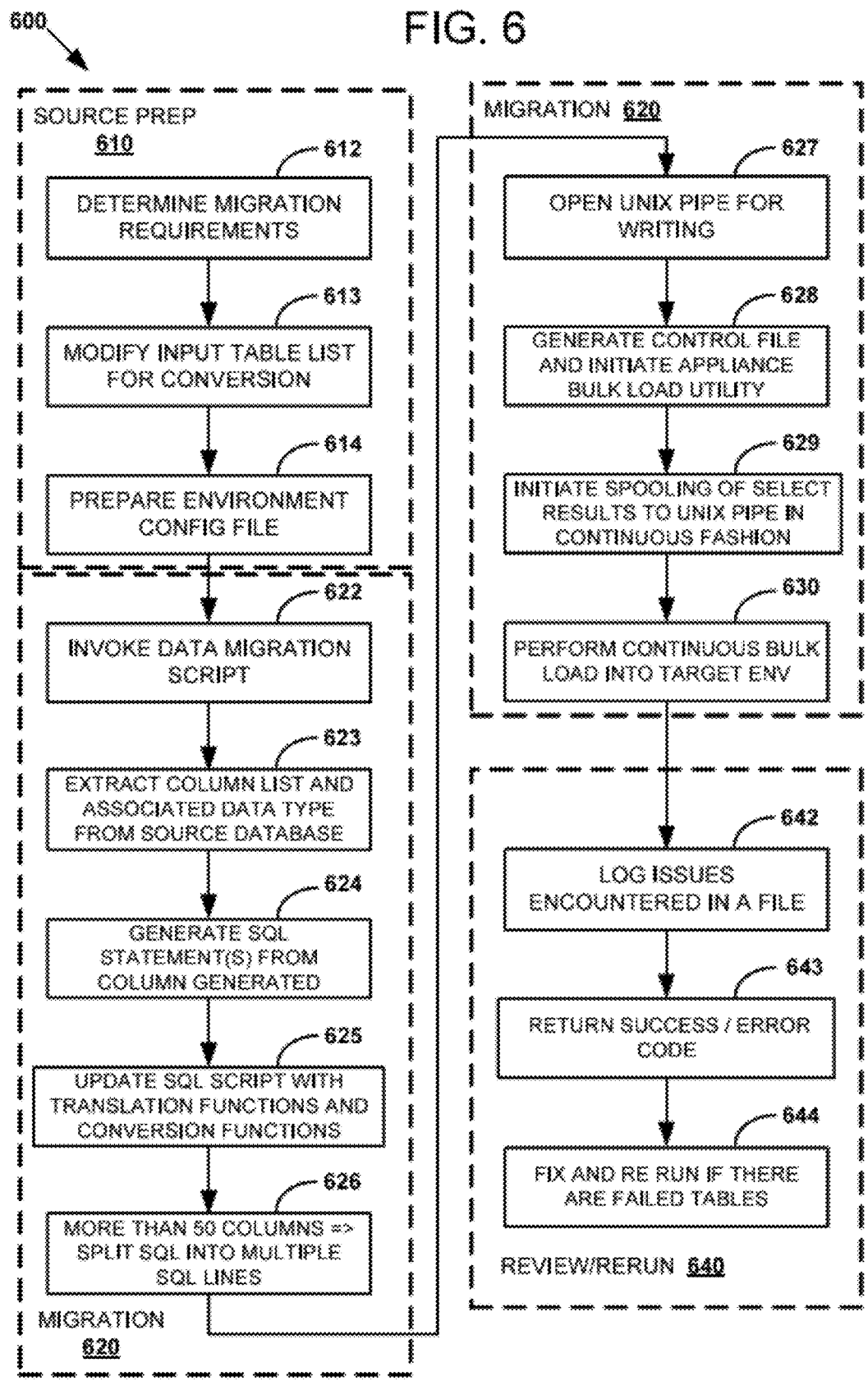
FIG. 6 is a flow chart further detailing an example implementation of the method of FIG. 3, including migration of data from a source environment (e.g., an RDBMS-based system) to a target environment (e.g., a data warehouse platform).

FIG. 6 is a flow chart 600 further illustrating data migration techniques that can be performed in some implementations of the exemplary method depicted in FIG. 3, including techniques performed at process block 330. As shown, during a source prep phase 610 the existing source and/or target environments are analyzed to understand migration requirements (at process block 612) and a list of input tables is updated for conversion (at process block 613). In addition, at process block 614, environment configuration data is generated and stored in a configuration file.

During a migration phase 620, a data migration script is invoked (at process block 622) to execute one or more of the functions at process blocks 623-630. At process block 623, a column list and associated data types are extracted from one or more source databases. At process block 624, SQL statements from one or more source columns are generated, and at process block 625, a number of SQL scripts are updated with translation functions and conversion functions for converting SQL data from the source environment to the target environment. At process block 626, the column list extracted at process block 623 is checked to see if there are more than 50 columns and, if so, the SQL script is split into multiple lines, thereby reducing overall SQL migration complexity to a manageable level. Other numbers of columns can also be used as the threshold for splitting the SQL script. Thus, a target-compliant mapping for migrating data from a source environment to a target environment is generated.

At process block 627, inter-process communication is initiated between, for example, the data migration script and migration utilities in the target environment. As shown, a Unix pipeline is opened for the communication, but as will be readily understood, any suitable technique for communicating migration instructions to the target environment can be used. For example, a remote procedure call to a remote server forming part of the target environment, the use of file, buffers, or other suitable techniques can be employed.

At process block 628, a number of control files for execution in the target environment are generated and a load utility (e.g., a DW appliance bulk load utility) is initialized using, for example, the Unix pipeline opened at process block 627.

At process block 629, spooling of selected results is initiated in a continuous fashion, and continuous bulk load to the target environment (e.g., a target DW appliance) is performed, as shown at process block 630.

Figure 19:
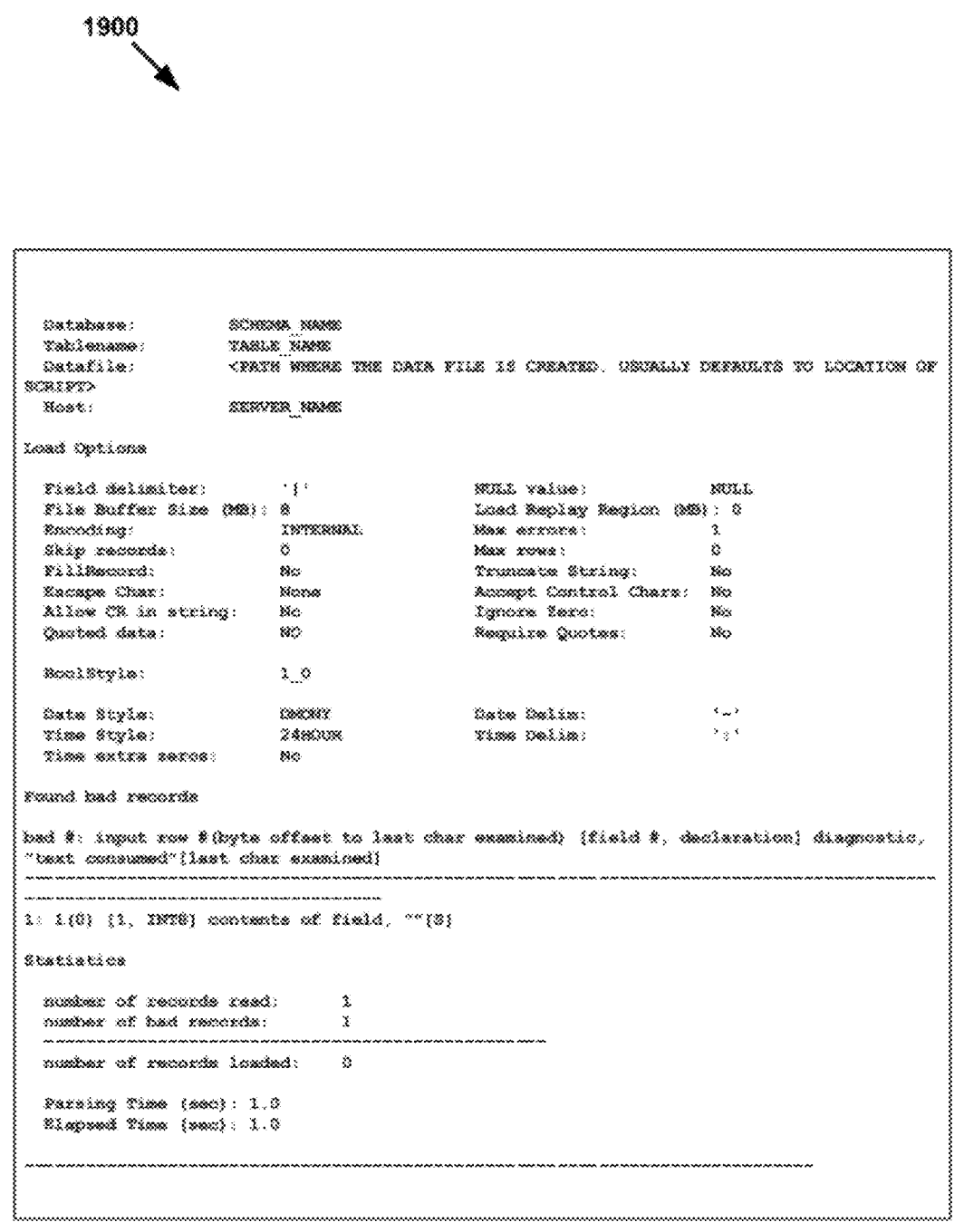

During a review/rerun phase 640, execution of the migration scripts is monitored to determine whether migration issues occurred, and, if such a determination is made, re-running of a portion or all of the data migration can be initiated. As data is migrated, errors, warnings, or other issues are logged (e.g., in a log file) at process block 642, and at completion of a migration phase 620, an error code (or success code, if no issues are determined) is generated at process block 643. FIG. 19 is an example migration report 1900 reporting errors reporting during migration at process block 642. As shown, a bad record in the source data is detected at input row 1 of the input SQL table. Instead of a blank string " ", an 8-bit integer was expected. At process block 644, any tables that are determined to have failed to migrate properly or otherwise indicate a re-run can be re-run with updated configuration data and/or migration scripts and by re-executing one or more steps of the data migration process. In some examples, the configuration and/or conversion scripts are updated manually, while in other examples, at least a portion of the updating can be performed automatically using a computer.

A data migration tool for performing the method depicted in FIG. 6 can generate column lists using source database catalog tables and their associated data type details. The tool can also add necessary conversion and translation functions to ensure data completeness and correctness. The data migration tool preferably leverages data streaming (e.g., using Unix or Linux pipes) to avoid disk-based access and to support high-performance data movement. The tool can also automatically generate target database-specific control files for bulk loading of the target environment, and can also perform asynchronous load processing.

FIGS. 18A-18C include an example list of SQL tables 1820 and example listings of source code 1810 and 1830 for an example implementation of portions of migration phase 620, including functions performed at process blocks 627-630. FIG. 18A lists source code 1810 for executing a shell script ("DB_oracle_nzload.sh") included in source code listing 1830 by invoking the shell script for each table in a list of tables 1820. FIG. 18B is an example format for a list of tables 1820. FIG. 18C is a source code portion 1830 of an example shell script for performing data migration. As shown, a query command 1840 is generated for accessing an SQL database in the source environment and building a query for the currently specified table. For the currently selected table, a dynamic SQL file is generated using source 1845, including the query command 1840. An nzload command is then invoked for initiating the target environment for data transfer using additional source code 1850. Also shown is source code for invoking an sqlplus call 1860 in the source environment, thereby initiating migration between the source environment and the target environment using Unix pipes. In some examples, a log file is generated for every table that is migrated, and another log file can be created to store any errors that occur during migration.

Figure 7:
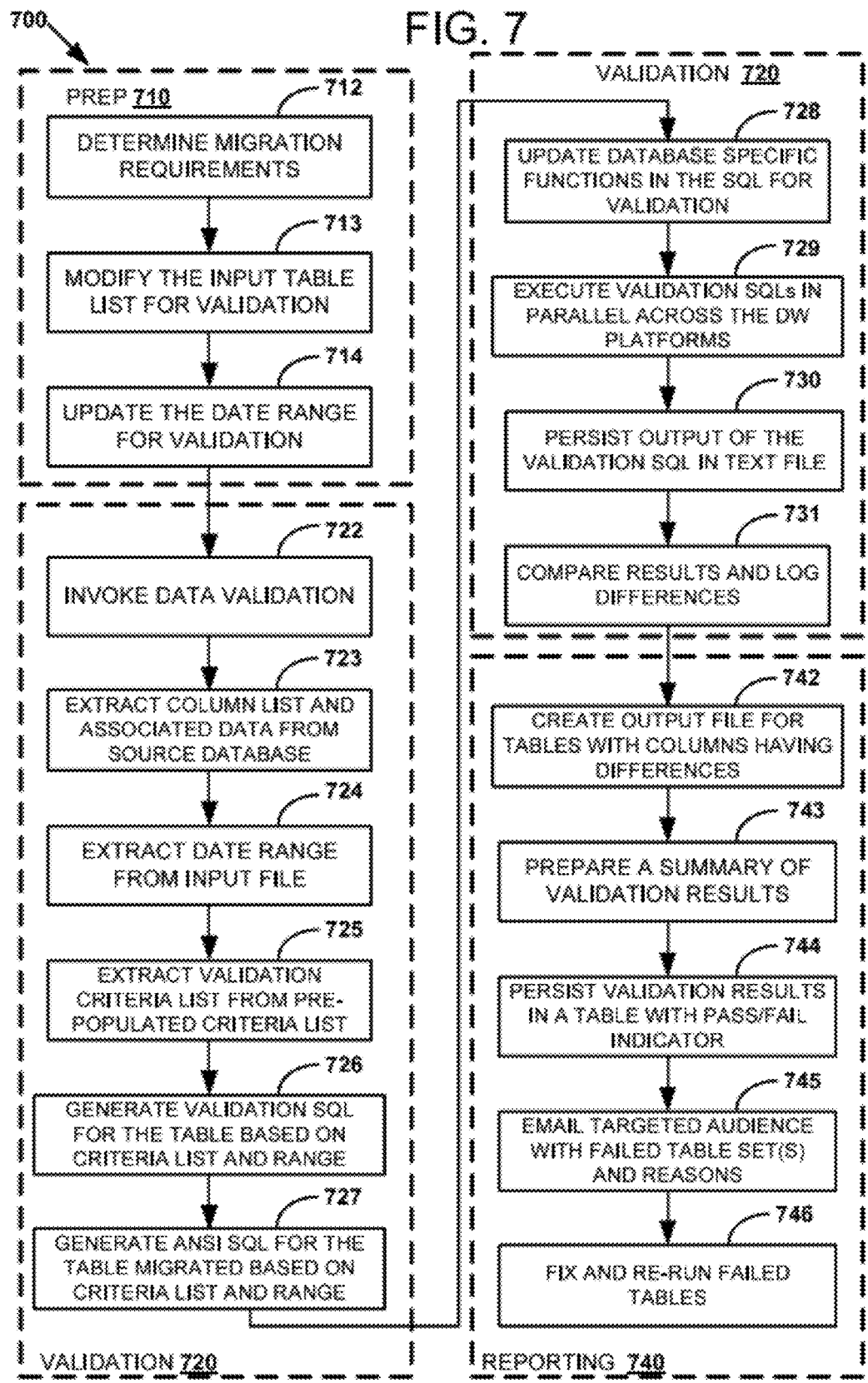
FIG. 7 is a flow chart further detailing an example implementation of the method of FIG. 3, including validation of data that has been migrated to a target environment.

FIG. 7 is a flow chart 700 further illustrating data validation techniques that can be performed in some implementations of the exemplary method depicted in FIG. 3, including techniques performed at process blocks 340 and 350.

As shown, a preparation phase 710 includes analyzing existing source and/or target environments to understand migration validation requirements (at process block 712) and generating a list of input tables for validation (at process block 713). In some examples, only a selected number of available input tables are including in the validation list, while in others, all available tables are included in the validation list. The selection of tables can be determined manually, or be based on criteria based on a previous migration and/or validation run (e.g., using data criteria for a previous run). At process block 714, a data range is selected for validation, and a data validation script is invoked. For example, only data migrated within the last 24 hours, or other suitable time period, can be validated, thus avoiding re-validation of previously migrated data. In some examples, the data range can be based on data that was migrated during the last N number of attempts (for example, the validation date range is set to cover the last attempt, or last three attempts).

Also shown is a validation phase 720, which can be initiated by invoking a data validation script (e.g., at process block 722), which can use the validation criteria data produced at process blocks 712-714. Next, a column list and data types associated with the column list are extracted from a database in the source environment (at process block 723). At process block 724, a date range is extracted from an input file generated at process block 714, and, using the selected data range, and a validation criteria list is extracted from a previously-generated criteria list table at process block 725.

At process block 726, validation SQL code is generated for the selected tables based on the criteria list and date range, and at process block 727 ANSI SQL is generated for the migrated table for storing generated SQL queries. For example, SQL code listing 2000 of FIG. 20 is an example of such an ANSI SQL listing.

At process block 728, database-specific functions are updated to use appropriate SQL for the target environment.

At process block 729, execution of the validation SQL code is invoked, using, for example, parallel threads to execute the SQL code across DW platforms of the target environment. At process block 730, output of the validation SQL invoked at process block 729 can be stored in, for example, a text file or other suitable format.

At process block 731 a comparison of the results is generated. In some examples, output of the validation SQL is stored in a persistent manner such that validation results across multiple data validation and/or data migration flows can be compared. Some examples of comparisons that can be performed include comparing the number of rows between a table in the source environment and a migrated table in the target environment, and comparing data stored in source environment and target environment tables. For example, data results can be stored in a database of the target environment using, for example, SQL code 2010 of FIG. 20, which lists a number of tables that have comparison or row count errors after migration.

During a validation reporting phase 740, a number of acts are taken to report the validation results and prepare for potential re-runs of the data migration and or data validation based on the results. At process block 742, an output file is created for each validated table with a column having a different output than expected. At process block 743, the validation results are summarized and output using, for example, a "pass" or "fail" indicator, or other suitable metric. At process block 744, the validation results can be persisted for comparison with previous and/or subsequent data migration and/or data validation runs. At process block 745, an email is sent including validation results for failed tables to a targeted audience, for example, a database engineer invoking and validating the data migration. Validation results can also be reported using other suitable techniques, for example, by updating a web page or displaying results in a window of a computer application.

At process block 746, based on the validation results, a number of input parameters for the overall migration flow are updated, for example, the input table list, configuration file, or other suitable flow parameters. In some examples, the input parameters are updated manually, while in other examples, the validation workbench can automatically update at least some of the parameters based on validation results. For example, the input parameters can be updated to include only tables that failed validation. Based on the updated input parameters, all or a portion of the overall flow illustrated in FIG. 3 can be re-run. Thus one or all of process blocks 310, 320, 330, 340, and 350 can be repeated, and validation performed again.

In some examples, a data validation tool leverages the pre-built knowledge bank on multiple databases to prepare the data validation criteria list. In some examples, this is an exhaustive list of data validation test cases. The data validation tool can also automatically generate database-specific SQL code based on, for example, a data validation criteria list and range criteria in order to enable multiple and/or incremental runs.

In some examples, a data validation tool can also automatically compare validation output and identify specific details regarding the columns, criteria and/or values that are not matching properly. The data validation tool can also persist validation results across multiple runs in a table such that, for examples, trends can be compared across multiple test cycles. For example, increasing or decreasing validation "cleanness" can be evaluated based on the persisted validation results.

In some examples, a data validation tool can use an asynchronous process to support both micro- and macro-data validation testing. Moreover, because the validation scripts are generated using configuration data, the effort to generate test scripts and automate the validation can be reduced.

Example ETL Migration Flow

Figure 8:
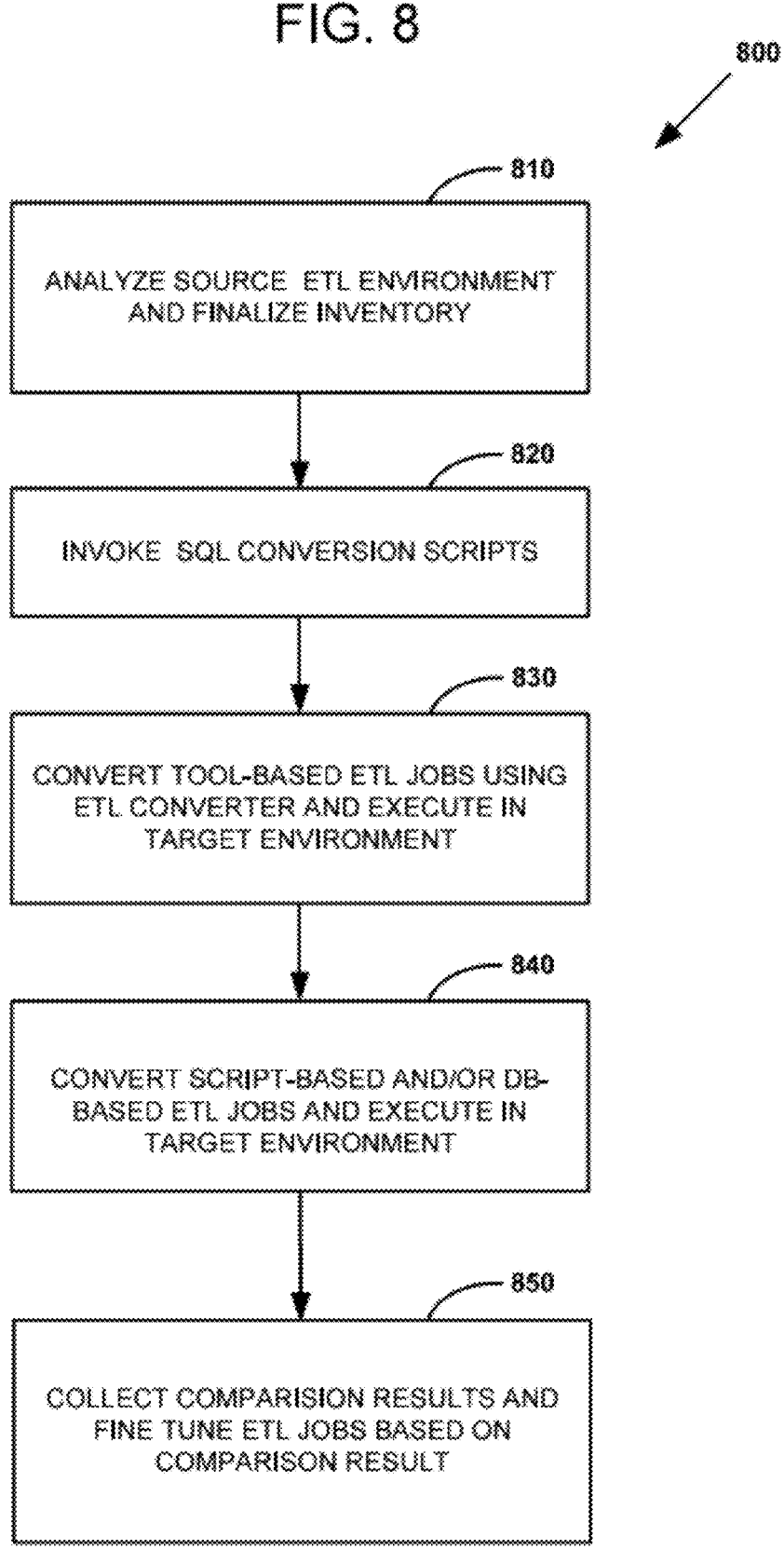
FIG. 8 is a flow chart that outlines an exemplary method of migrating ETL components of a source environment to a target environment.

FIG. 8 is a flow chart 800 that outlines an exemplary method of migrating existing ETL components in a source environment (e.g., an Informatica repository) to a target environment (e.g., a DW appliance). Using an automated approach allows rapid deployment of the target environment with high quality across the migrated ETL components. The method outlined in FIG. 8 can be carried out using a system referred to collectively as an ETL workbench. For example, the ETL analysis workbench 240, ETL migration workbench 250, and ETL quality assurance workbench 260 depicted in FIG. 2 are high-level examples of a suitable system for performing ETL migration.

ETL refers to a technique that can be used in a Data Warehouse environment to extract data from a system of records, transform that data into a standardized form, and load the transformed data into a data warehouse (e.g., a Data Warehouse appliance). There are multiple approaches to using ETL techniques. Informatica, Business Objects Data Integrator, Ab Iinitio, and IBM InfoSphere Data Stage are examples of ETL tools. Other examples of ETL techniques include the use of DB Scripting languages (e.g., PL/SQL or SQL), along with shell scripts, BTEQ (Basic TEradata Query) scripts, or any other database-specific scripting language for ETL. Issues that arise during migration and/or conversion of ETL from a source database environment to a target database environment include converting source database-specific SQL to target database-specific SQL, converting source environment-specific definitions to target environment-specific definitions (e.g., data type, function usage, null usages, expression usages, and system property settings specific to the source environment or the target environment). In examples involving migration of database-specific ETL script, syntaxes and SQL scripts need to be converted to a target-complaint syntax. Examples where these issues arise include converting Oracle PL/SQL code to Netezza PL/SQL code, along with their respective associated syntaxes.

At process block 810, an existing source environment is analyzed to produce an inventory of ETL components to be migrated to a target environment. For example, a list of sources with their corresponding name in the target environment, source qualifiers, and folder names can be generated.

At process block 820, one or more SQL conversion scripts are executed to convert SQL code from the source environment to the target environment.

At process block 830, tool-based ETL jobs in the source environment are converted using an ETL job that is converted and executed in the target environment.

At process block 840, script- and/or database-based ETL jobs are converted using a script that has been converted and executed in the target environment.

At process block 850, an ETL validation tool is executed to collect comparison results across the ETL migration process. ETL jobs can then be fine-tuned based on the comparison results.

Figure 25:
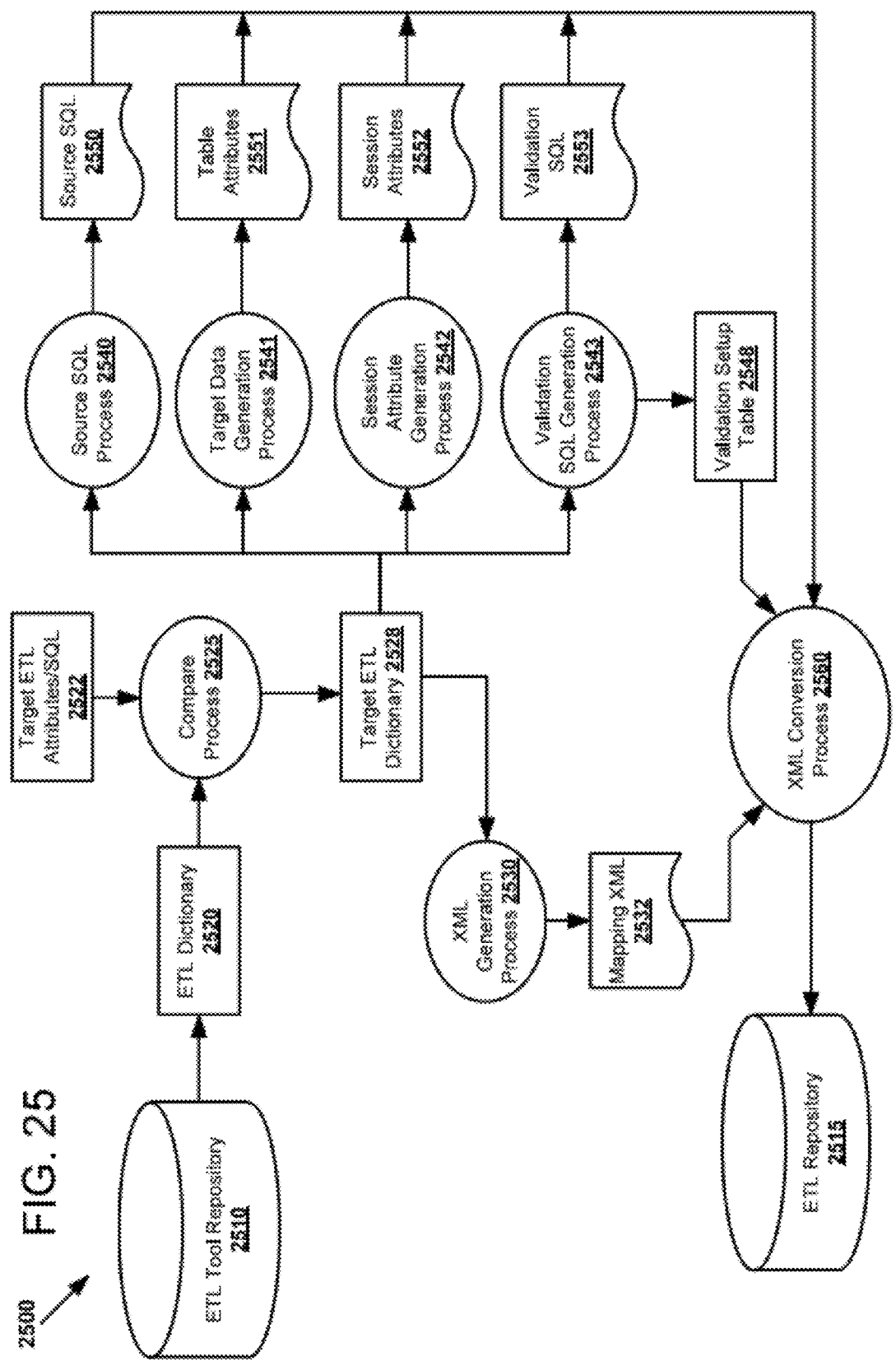
FIG. 25 is a flow diagram illustrating an example data flow used in some implementations of an ETL migration flow.

FIG. 25 is a flow diagram 2500 illustrating an example data flow used in some implementations of the example method depicted in FIG. 8 and FIGS. 9-13 (which are described in more detail below).

As shown, data from an ETL tool repository 2510 is read to produce an ETL dictionary 2520, which can be stored as, for example, a file. Also shown is a set of target ETL attributes and SQL data 2522, which describes physical attributes of the target ETL environment, and which can also be stored as, for example, a file. A shown, a compare process 2525 is used to compare the ETL dictionary 2520 to the set of Target ETL attributes and SQL data 2522 and produce a target ETL dictionary 2528, which is used by a number of data migration processes 2540-2543 as input files and configuration data for performing data migration. In some examples, the target dictionary includes descriptions of mappings for a number of properties and/or tables in the source environment to the target environment. The target ETL dictionary 2528 can include information describing mappings for computing resources, database tables, and rules for mapping source SQL, table attributes, session attributes, and validation SQL from the source environment to the target environment. Thus, the data flow concerning the compare process 2525 corresponds to migration analysis that can be performed in some implementations of process block 810.

As shown, a number of data migration processes 2540-2543 use the target ETL dictionary 2528 in performing data migration. For example, source SQL process 2540 uses the target dictionary 2528 to produce migrated source SQL code 2550. Thus, source SQL process 2540 corresponds to SQL conversion that can be performed in some implementations of process block 820 and some implementations depicted in flow charts 900 and 1000, which are described in further detail below. Similarly, target data generation process 2541 uses the target dictionary 2528 to produce table attributes 2551, as can be performed in some implementations of process block 820 and some implementations depicted in flow charts 900 and 1000, which are described in further detail below.

Also shown is a session attribute generation process 2542, which uses the target ETL dictionary 2528 to produce session attributes 2552. Thus, session attribute generation process 2542 corresponds to session attribute generation that can be performed in some implementations of process block 850 and some implementations depicted in the flow chart 1300, which is described in further detail below.

Also shown is a validation SQL generation process 2543, which uses the target ETL dictionary 2528 to produce validation SQL 2553. In addition, the validation SQL generation process 2543 produces validation setup table(s) 2548 that can be used during an XML conversion phase 2560. Thus, the validation SQL generation process 2543 corresponds to validation SQL generation that can be performed in some implementations of process block 850 and some implementations depicted in the flow chart 1300, which is described in further detail below.

Also shown is a data generation process 2530 that reads data from the target ETL dictionary 2528 and produces mapping XML code 2532 that is used in an XML conversion process 2560. Thus, the data generation process 2530 corresponds to XML generation that can be performed in some implementations of process block 830 and some implementations depicted in flow chart 1100, which is described in further detail below.

Also shown is an XML conversion process 2560. The XML conversion process can use the mapping XML code 2532 and validation setup table 2548 to generate XML code representing data from migrated data such as source SQL code 2550, table attributes 2551, session attributes 2552, and validation SQL code 2553. Thus, the migration controller process 2560 produces XML code that can be stored in ETL repository 2515 for use with ETL conversion validation. For example, data in the ETL repository 2515 can be used in some implementations of process block 850 and some implementations of ETL validation depicted in flow chart 1300, which is described in further detail below.

Figure 9:
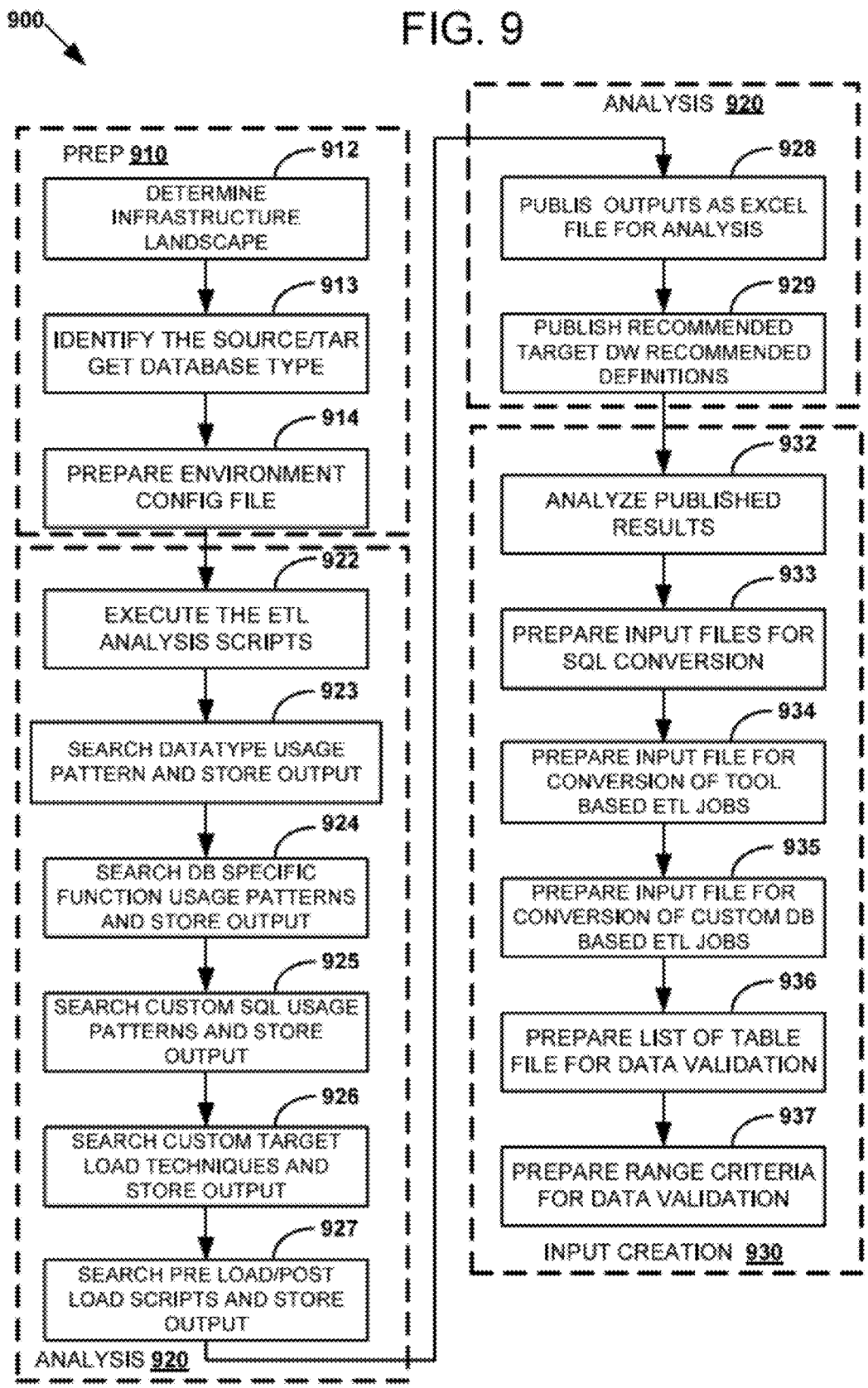
FIG. 9 is a flow chart further detailing an example implementation of the method of FIG. 8, including analysis of ETL components.

FIG. 9 is a flow chart 900 further illustrating implementations of the exemplary method depicted in FIG. 8. During preparation phase 910, the ETL migration flow input files and scripts are initialized. At process block 912, the source and target environments are analyzed to determine ETL migration requirements. For example, a source repository (e.g., an Informatica Repository) can be analyzed to obtain a list of all source data available, along with a corresponding mapping name, source qualifier, and folder name. At process block 913, the source and target database types are identified. This includes generating a list of tables present in the source database, along with an associated owner name. Similarly, the target environment is analyzed to obtain a list of targets with corresponding mapping names and folder names, associated owner names, and a list of all targets pointing to the target database. Further, a list of all lookup tables available in the source repository can be obtained with corresponding mapping and folder names. At process block 914, configuration data is prepared as, for example, a configuration file. The configuration data can include, for example, environment information such as domain names, server names, user names, or passwords. In some examples, the configuration file can also include references to lists of tables, metadata used during ETL migration, and references to particular mapping code and/or scripts to be used during the ETL migration flow.

During an analysis phase 920, ETL analysis is performed using, for example, a number of scripts, and output is produced for further analysis. At process block 922, ETL conversion scripts are executed to analyze the existing ETL functions, including searching and analyzing datatype usage patterns (at process block 923), database-specific function usage (at process block 924), custom SQL code usage patterns (at process block 925), custom target load techniques (at process block 926), and pre-load or post-load scripts (at process block 927. At process block 928 an ETL analysis script produces output from process blocks 923-927 as, for example, a Microsoft® Excel file, or other suitable data format. At process block 929, recommendations for definitions for the target environment (e.g., a target DW appliance) are output using, for example, an ETL analysis script.

FIG. 21 includes an example source code listing 2100 of a source environment database query that can be used as part of the analysis performed at process block 923. As shown, a list of all the sources available in a source database, along with corresponding mapping names, source qualifiers, and folder names can be generated. In addition, a list of all the tables present in the source database can be obtained along with corresponding owner names, and a list of all the sources pointing to the source database.

Also shown is a source code listing 2110 of a target environment database query that can be used for analyzing the target environment. As shown, a list of all targets available in the list of tables present in the target database can be obtained, along with corresponding owner names, along with their corresponding mappings and folder names, a list of tables present in the target database, and a list of all the targets pointing to target database.

Figure 26:
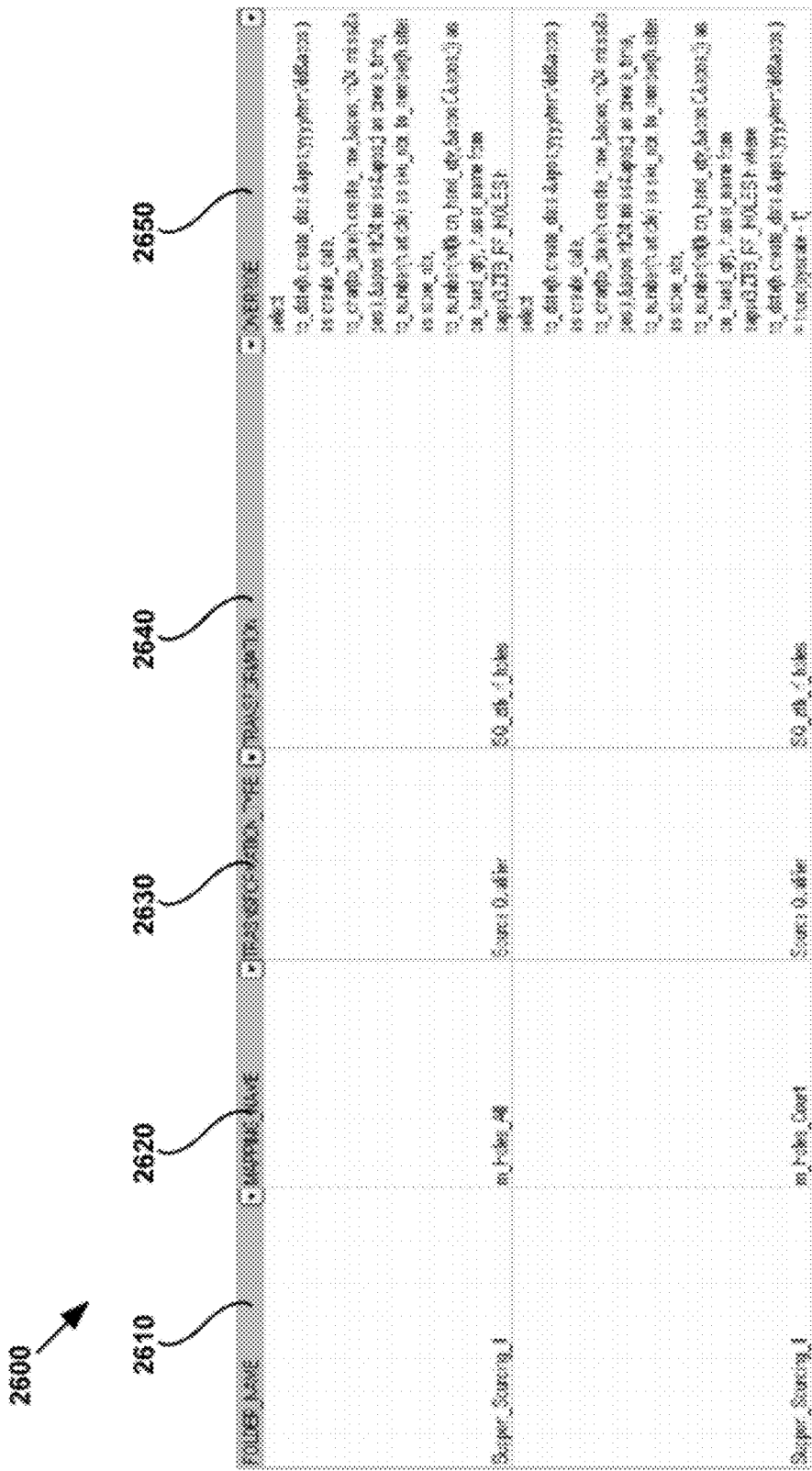
FIG. 26 is an example output file produced during some implementations of database analysis disclosed herein.

FIG. 26 is an example output file 2600 that can be produced as part of the ETL analysis performed at process block 928 using, for example, an ETL analysis workbench 210. As shown, a number of columns 2610, 2620, 2630, 2640, and 2650 store results from an exemplary ETL Repository database analysis. Column 2610 is a listing of folder names and column 2620 is a listing of mapping names corresponding to the folder names. Also shown are a column 2630 of transformation types, a column 2640 of transformations, and a column 2650 of overrides to be used during data migration.

During an input creation phase 930, input files are prepared for the conversion process based on the analysis of published results at process block 932. At process block 933, input files are prepared for SQL conversion. At process block 934, input files are prepared for conversion of tool-based ETL jobs. At process block 935, input files are prepared for conversion of custom-DB-based ETL jobs. At process block 936, a list of table files for data validation is produced and can be stored in a file. At process block 937, range criteria for data validation are produced and can be stored in a file.

In some examples, the techniques described in FIG. 9 can use an ETL analysis workbench, which uses pre-built knowledge based on multiple databases, ETL techniques, and tools to search for different patterns of source database specific usage in the ETL jobs through repository-based SQL code and text searching of patterns inside the ETL scripts. The ETL analysis workbench can identify and report potential problematic properties. For example, some potential problems can arise in the target environment for a data type not being supported, data type precision differences, SQL overrides in the source environment, source database-specific function usage, or other such problematic properties that are not in compliance with the target environment. The ETL analysis workbench further includes prebuilt functions to identify load techniques and ETL job properties that allow determination of job execution sequences and load level properties. The ETL analysis workbench also searches and identifies columns that have whitespace and other special characters, so that these may be migrated to the target environment appropriately.

FIG. 22 includes a source code listing 2200 for performing an analysis of lookup tables available in a source environment, along with corresponding mappings and folder names. Thus, a list of lookup tables pointing to the source database can be obtained. Also shown is a source code listing 2210 for analyzing the source environment to obtain a list of SQL and/or LKP overrides in the source environment, along with their corresponding mappings and folder names. In some examples, a C or Java program can be used to convert SQL queries to XML queries. Hence, the SQL query may contain special characters.

Figure 10:
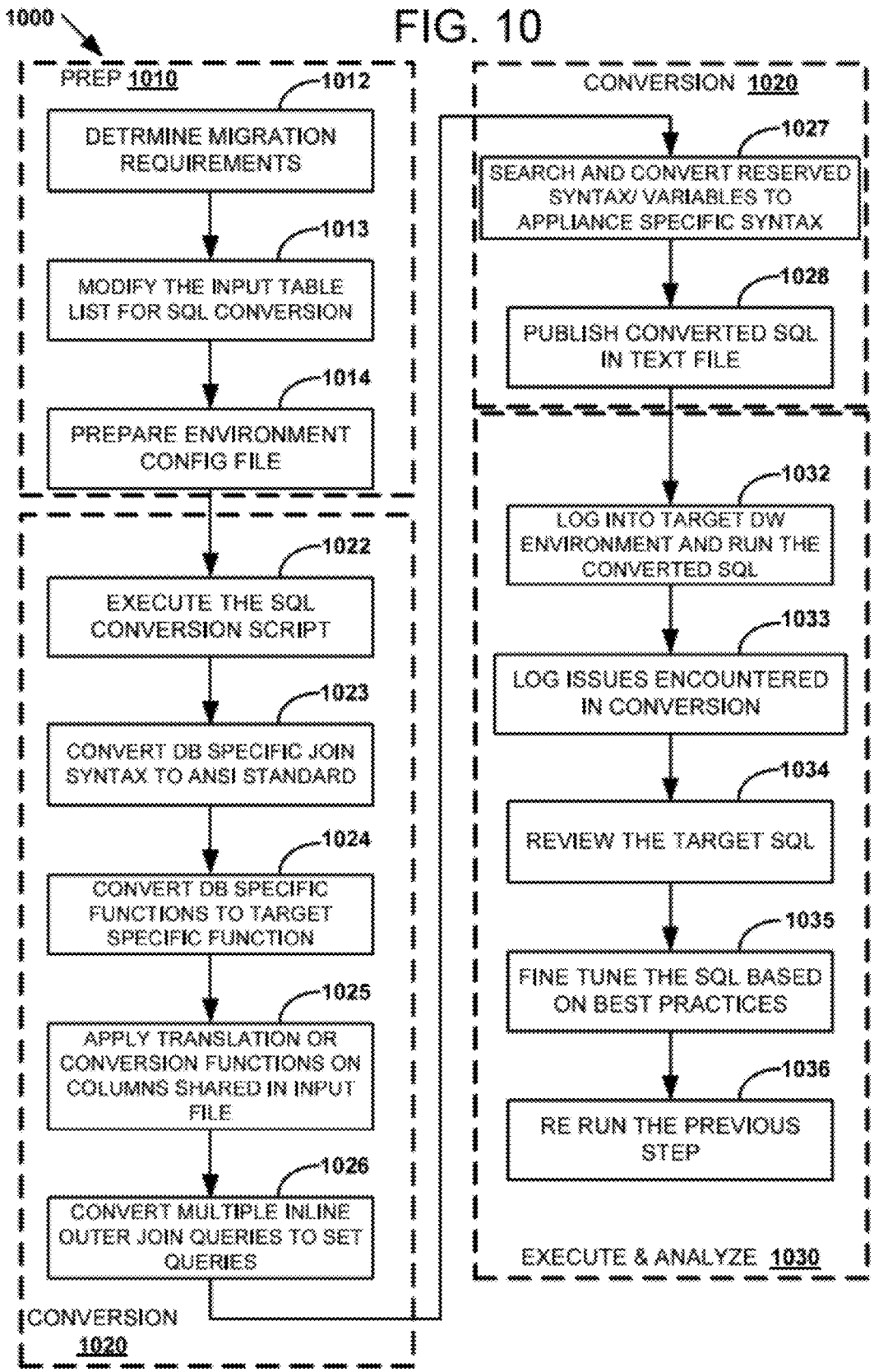
FIG. 10 is a flow chart further detailing an example implementation of the method of FIG. 8, including conversion of SQL data.

FIG. 10 is a flow chart 1000 further detailing execution of a number of SQL conversion scripts that can be performed in some implementations of the method depicted in FIG. 8, including techniques performed at process block 820.

As shown, the existing source environment is analyzed during a preparation phase 1010. During the preparation phase 1010, migration requirements, including identification of source and target databases, is performed at process block 1012. At process block 1013, a modified input table list is produced as an input for SQL conversion. At process block 1014, configuration data is prepared as, for example, a configuration file. The configuration data can include environment information, references to lists of tables, references to metadata and/or SQL code used for SQL conversion, references to DB-specific and/or target-specific functions, and other information used to generate mappings between the source environment and the target environment.

During a conversion phase 1020, SQL is converted from the source environment to the target environment. For example, at process block 1022, SQL conversion scripts are invoked that use the configuration data from process blocks 1013 and 1014 to search and convert SQL data. At process block 1023, database-specific join syntax is converted to ANSI-standard join conventions. At process block 1024, source database-specific functions are converted to target database-specific functions. At process block 1025, translation or conversion functions are found and applied to shared columns. At process block 1026, inline outer join queries are converted to set queries. At process block 1027, reserved syntax and/or variables in the source environment are converted to a target environment-specific syntax. At process block 1028, the converted SQL produced at process blocks 1023-1027 can then be published as, for example, a text file. At this point, the SQL conversion is ready for execution in the target environment to generate target-compliant mappings for SQL migration.

During an execute and analyze phase 1030, converted SQL generated during the conversion phase 1020 is executed and reports are generated so that the conversion can be fine-tuned. At process block 1032, SQL conversion scripts generated at process blocks 1023-1028 are executed in the target environment. At process block 1033, issues such as warning or errors can be logged. At process block 1034, target SQL information can be reviewed to determine the causes of issues logged at process block 1033. In some examples, the information is reviewed manually, while in other examples, at least a portion of the review is performed by a computer (e.g., using a script). At process block 1035, input files, configuration files and/or conversion scripts are adjusted in order to improve the SQL conversion results. In some examples, the files and scripts are adjusted manually, while in other examples, at least a portion of the adjusting can be performed by a computer (e.g., using a script). At process block 1036, one, several, or all of the process blocks 1022-1028 and 1032-1034 can be re-run in order to improve the SQL conversion results.

The techniques detailed in FIG. 10 can be implemented using an SQL conversion tool that uses a pre-built knowledge bank file of source and/or target databases to search and replace the input patterns of source database-specific SQL syntaxes into target appliance-specific SQL syntaxes, including such parameters as data types, data type precisions, reserved words, database functions, analytical functions, join conditions, ANSI standard SQL syntax, or other suitable parameters in compliance with the target database environment, as discussed further above. The SQL conversion tool can also modify the syntax of the SQL to be target environment-specific and highlight any non-supported syntax from source SQL scripts.

Figure 11:
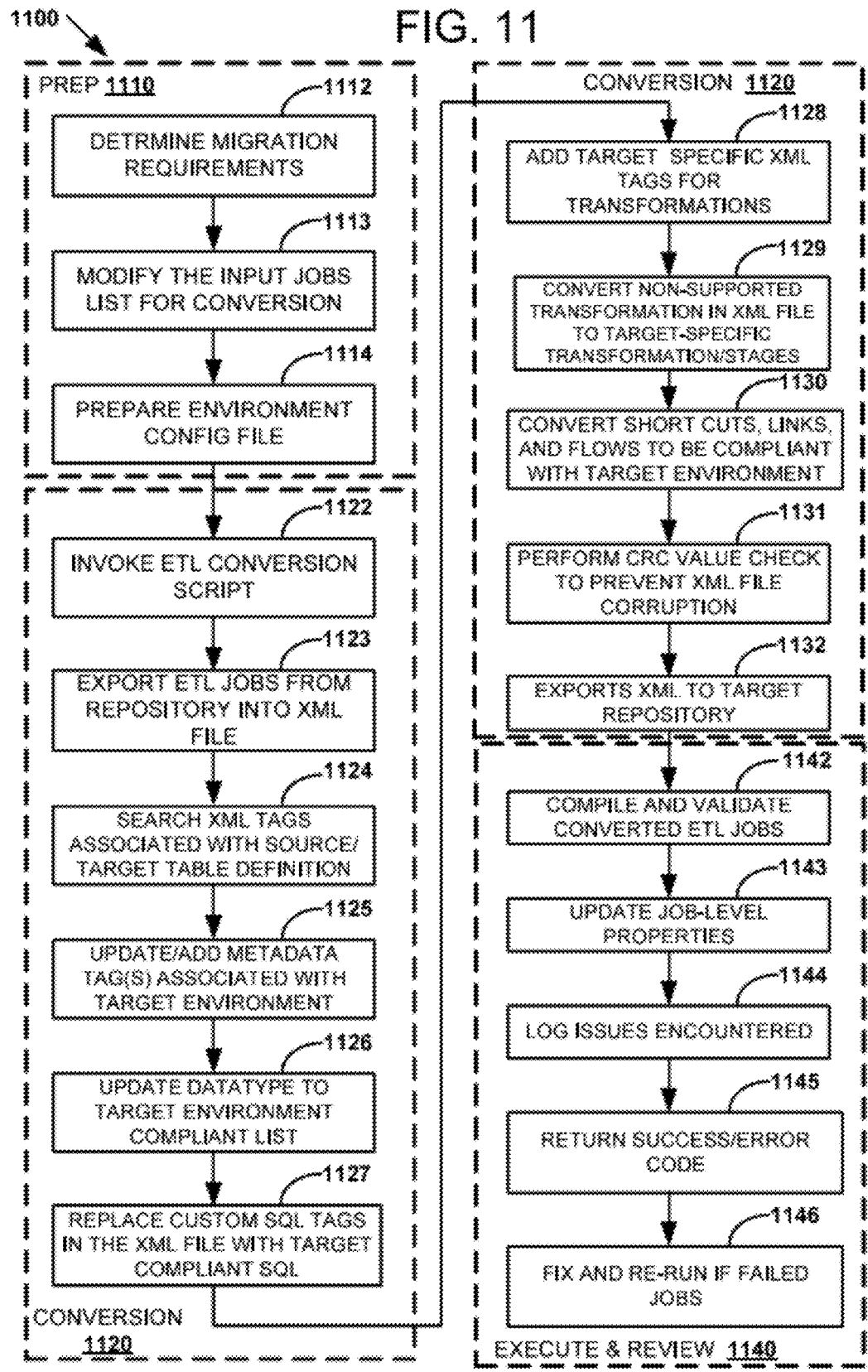
FIG. 11 is a flow chart further detailing an example implementation of the method of FIG. 8, including an ETL job conversion process.

FIG. 11 is a flow chart further illustrating tool-based ETL job conversion techniques that can be performed in some implementations of the exemplary method depicted in FIG. 8, including techniques performed at process block 830. Tool-based ETL job conversion can be used to convert data from ETL tools (e.g., Informatica, Datastage, or Business Objects Data Integrator) that have their own internal language and/or expressions for the Extraction, Standardization, and Loading process. Tool-based ETL job conversion can us metadata of the ETL jobs and ETL mapping to use techniques employing XML to convert metadata, SQL, properties, expressions, and/or system settings from a source environment to a target environment. In the both the cases the source ETL Program will have all the properties, syntaxes and settings specific to source database. An ETL migration workbench can migrate and convert the source ETL program to target environment-complaint form, further detailed below.

During a preparation phase 1110, migration requirements are analyzed and converted into a set of input data for the conversion flow. At process block 1112, the existing source and/or target environments are analyzed to understand requirements for ETL migration. At process block 1113, an input job list is produced that includes the appropriate ETL jobs to be converted during the ETL job conversion phase 1120. At process block 1114, environment configuration data is produced. Configuration data can be generated as, for example, a configuration file to be read by an ETL conversion script.

During a conversion phase 1120, the ETL jobs in the input jobs list are converted to the target environment using metadata stored in, for example, XML files. At process block 1122, an ETL conversion script is invoked, and the ETL conversion script then initiates several aspects of the ETL conversion. At process block 1123, ETL jobs are exported from a source repository to an XML file. At process block 1124, XML tags in the XML file are searched to determine tags associated with source and/or target table definitions. At process block 1125, those metadata tags associated with the target environment (e.g., metadata tags associated with the target appliance) are updated or added to the target environment. At process block 1126, datatypes in the source environment are updated to be compliant with the target environment, thereby forming a target environment-compliant list. For example, fixed point numbers in the source environment can be indicated for conversion to floating point numbers in the target environment. Thus, a target-compliant mapping for migrating ETL jobs from a source environment is generated.

At process block 1127, custom SQL tags in the XML file are searched and replaced with target-environment compliant SQL. At process block 1128, target environment-specific XML tags for one or more of the ETL conversions are added to the XML file. At process block 1129, transformations not supported in the target environment in the XML file are converted to target environment-specific transformations. In some examples, a single source transformation is broken into multiple transformation stages in the target environment. For example, a non-supported transformation can be replaced with two transformations in the target environment to result in an equivalent transformation to the original, non-supported transformation. Thus, a target-compliant mapping for migrating custom SQL tabs from a source environment is generated.

At process block 1130, short cuts and links are converted to be compliant with the target environment. At process block 1131, a Cyclic Redundancy Check (CRC) or other suitable error value check (e.g., MD5 or checksum checks) is performed to ensure the XML file has not been corrupted, and at process block 1132, the XML is exported to the target repository.

During an execute and review phase 1140, the converted ETL jobs are compiled, validated, and analyzed to determine if all or a portion of the conversion process should be updated and re-run.

At process block 1142, the converted ETL jobs from the conversion phase 1120 are compiled and validated in the target environment. At process block 1143, job-level properties are updated. At process block 1144, errors, warning, or other issues are logged as data is migrated to the target environment, and at completion of migration, an error code (or success code) is generated at process block 1145. If any ETL code that failed to migrate properly, configuration data, conversion scripts, or other data and/or executables can be updated (e.g., manually, or at least partially automatically by a computer running a script) and the migration flow can be run again at process block 1146.

In some examples, the techniques detailed in FIG. 11 are implemented using an ETL job conversion tool, which utilizes XML-based metadata to update the process to ensure the completeness and correctness of the conversion. The ETL jobs conversion tool can use a pre-built knowledge bank file of multiple source and/or target databases to search and replace the input patterns of source database-specific XML tabs into target appliance-specific XML tags, including data types, data type precisions, reserved words, database functions, custom SQL code, mapping and/or job properties, ETL tool-specific transformation syntaxes, ETL tool-specific analytical functions or other suitable data that are in compliance with the target environment. The ETL conversion tool can also modify metadata to be target appliance-specific and highlight any non-supported metadata tags.

Figure 12:
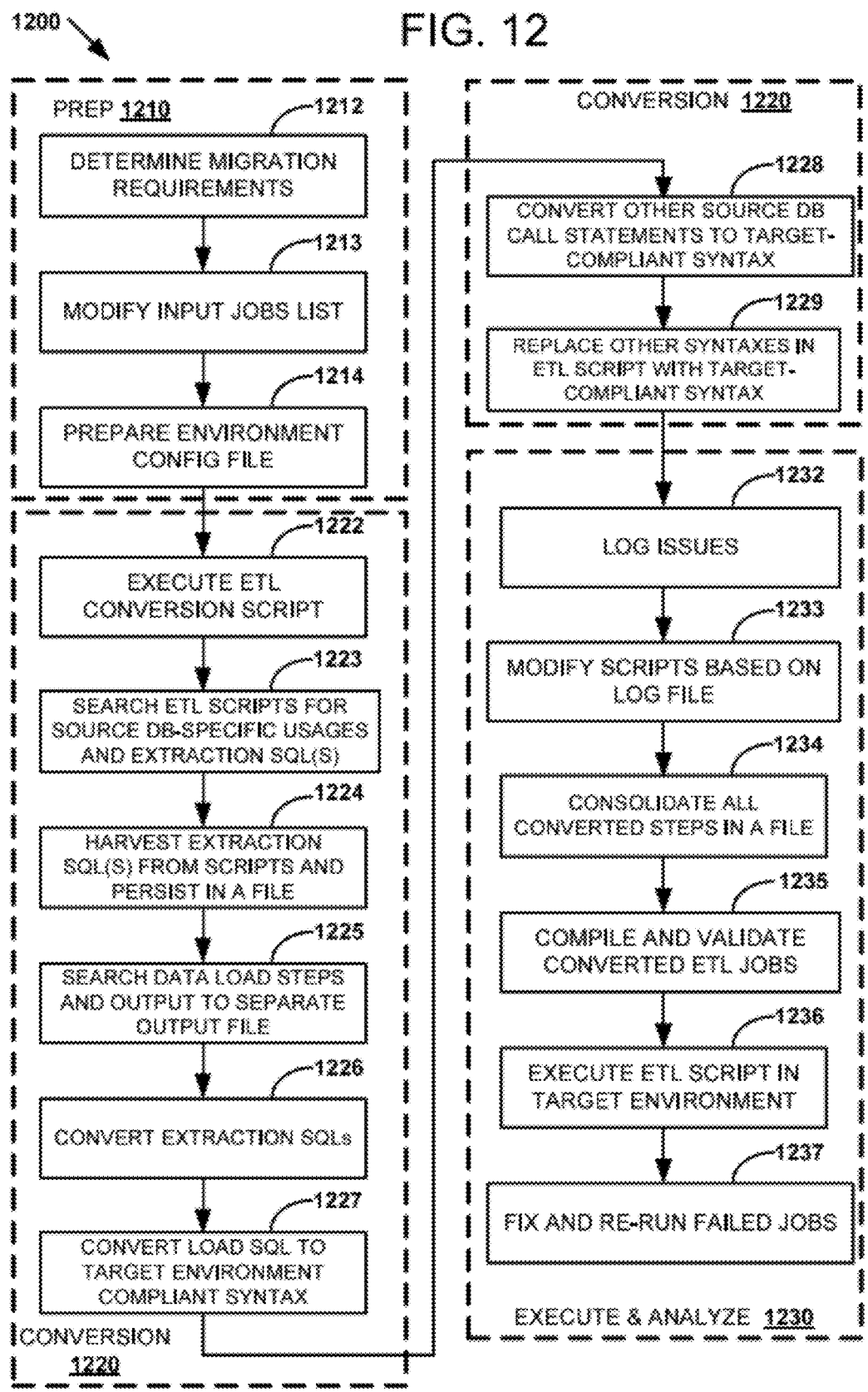
FIG. 12 is a flow chart further detailing an example implementation of the method of FIG. 8, including conversion of custom and/or DB-specific ETL scripts.

FIG. 12 is a flow chart 1200 further illustrating script-based and/or DB-based ETL job conversion techniques that can be performed in some implementations of the exemplary method depicted in FIG. 8, including techniques performed at process block 840. Script-based and/or DB-based ETL Job conversion the ETL scripts can be based on the syntax and program constructs of the source database environment Script-based and/or DB-based ETL job conversion can use all or a portion of source database environment-specific functions and settings. The Script-based and/or DB-based ETL jobs can be converted into target database environment scripts, for example, by converting Oracle PL/SQL to Netezza PL/SQL, or by converting Teradata BTEQ Scripts to Oracle Loader/PLSQL Scripts.

During a preparation phase 1210, migration requirements are analyzed and converted into a set of input data for the conversion flow. At process block 1212, the existing source and/or target environments are analyzed to understand the requirements for script-based and/or DB based ETL job conversion. At process block 1213, an input job list is produced that includes the appropriate ETL jobs to be converted during the ETL job conversion phase 1220. At process block 1214, configuration data can be generated as, for example, a configuration file to be read by an ETL conversion script.

During a conversion phase 1220, the ETL jobs in the input jobs list are converted to the target environment using, for example, an SQL conversion tool. At process block 1222 an ETL conversion script is invoked. At process block 1223, the ETL conversion script searches source ETL scripts of the source environment for DB-specific usage. At process block 1224, extraction SQL code is copied from the source ETL scripts and persisted using, for example, a file. At process block 1225, the ETL conversion script searches for data load steps in the source ETL jobs and copies the data loads to a separate output file. At process block 1226, extraction SQLs are then converted to a target environment-compliant syntax, using for example, an SQL conversion tool. At process block 1227, load SQL code is converted to a syntax compatible with the target environment, using, for example, an SQL conversion tool. Thus, a target-compliant mapping for migrating DB-specific ETL code from a source environment is generated.

At process block 1228, other source database call statements, are converted to a target environment-compatible syntax. At process block 1229, and any other syntaxes in the source ETL jobs are also converted to a target environment-compatible syntax.

During an execute and analyze phase 1230, logs generated during the conversion phase 1220 are analyzed in order to validate ETL job conversion and to update input files or conversion scripts. At process block 1232, as data is migrated, errors, warnings, or other issues are logged, and at completion of the migrations, an error code is generated. At process block 1233, for any code that failed to migrate properly, migration scripts, configuration, or other data can be updated and the migration flow can be run again. In some examples, the updating is performed manually, while in other examples, the updating can be performed automatically (e.g., with a script). At process block 1234, all converted steps are consolidated into a single file. At process block 1235, after the script-based and/or database-based ETL jobs have been converted to a target environment syntax, the new code is compiled and validated for the covered ETL jobs. At process block 1236, the resulting ETL script is executed in the target environment. At process block 1237, any failed jobs can be re-run in order to correct migration errors that occurred using previous migration script, configuration data, and/or input files.

In some examples, the techniques detailed in FIG. 12 can be implemented with an ETL scripts conversion tool that leverages pre-built knowledge bank files of multiple source and/or target databases to search and replace the input patterns of source database specific SQL syntaxes into target environment-specific SQL syntaxes, including such parameters as data types, data type precisions, reserved words, DB functions, analytical functions, SQL syntaxes, or other suitable parameters that are compliant with the target environment. The ETL scripts conversion tool can modify the syntax of scripts to be target environment-specific and also highlight non-supported syntax from the source ETL scripts. The ETL scripts conversion tool can also identify and document the sequence of execution of various steps to ensure the sequence of execution steps is maintained in the target ETL scripts.

In the absence of any load utility in the target environment, the conversion tool provides an SQL-based argument table and generic execution script that provides equivalent functionality for high volume loads in the target environment. The conversion tool can also convert Unix shell-based database call syntaxes to the equivalent target environment-based syntaxes. The conversion tool can also highlight any non-supported syntaxes in a separate file.

Figure 13:
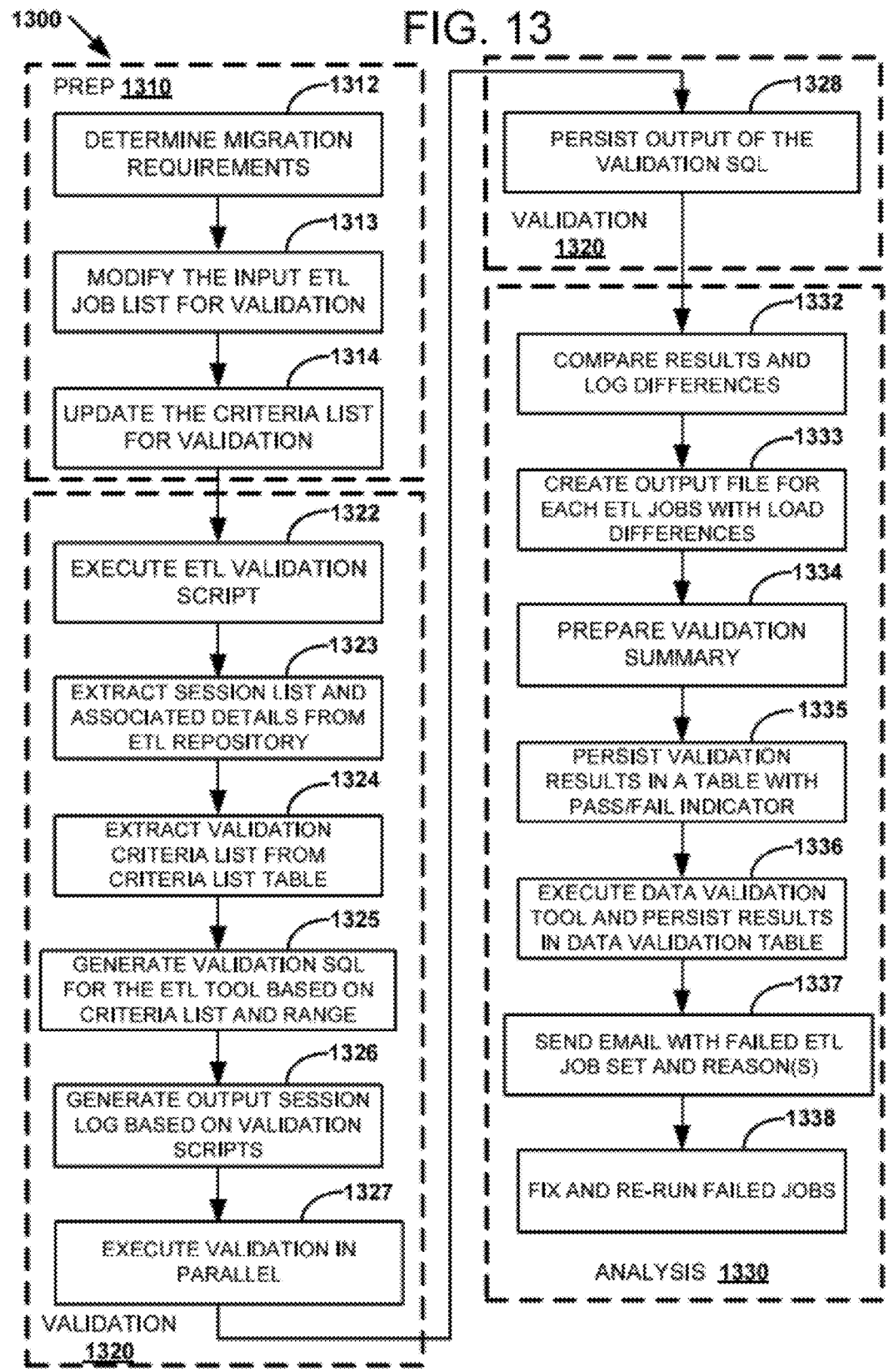
FIG. 13 is a flow chart further detailing an example implementation of the method of FIG. 8, including validation of ETL data that has been converted to a data warehouse platform.

FIG. 13 is a flow chart 1300 further illustrating data validation techniques that can be performed in some implementations of the exemplary method depicted in FIG. 8, including techniques performed at process block 850.

As shown, a preparation phase 1310 includes analyzing existing source and/or target environments to understand migration validation requirements (at process block 1312) and generating an input ETL job list for the ETL validation process (at process block 1313). At process block 1314, a list of validation criteria is generated and stored as, for example, a file. In some examples, only a selected number of available input tables are including in the validation list, while in others, all available tables are including in the validation list. In some examples, criteria such as a date range, or the last N number of attempts can be used to limit the validation to the ETL job migration runs of interest, using similar techniques to those described above regarding process block 714. For example, the criteria can be applies to include only a selected number of input tables in the validation list.

Also shown is a validation phase 1320, which can be initiated by invoking an ETL validation script (at process block 1322), which using the validation criteria data produced at process blocks 1312-1314.

During the validation phase 1320, validation criteria are extracted and validation is executed using, for example, a validation script. At process block 1323, a session list and associated details are extracted from a source ETL repository. At process block 1324, validation criteria are extracted from a per-populated criteria list table. At process block 1325, validation SQL code for an ETL tool is generated based on the criteria list and range data generated during the preparation phase 1310. At process block 1326, a session log with details of validation progress is generated.

At process block 1327, validation scripts and validation SQL code are executed in the target environment. In some examples, the validation can exploit parallel processing capabilities of the target environment. At process block 1328, output of the validation SQL code is persisted using, for example, a text file.

Also shown is an analysis phase 1330, during which validation results from the validation phase 1320 are analyzed and migration and/or validation re-executed based on the validation results. At process block 1332, validation results are compared between ETL migration runs and differences are logged using, for example, a file. At process block 1333, differences in data loads for each ETL job are automatically generated. By performing ETL load comparisons technical issues or missed records in the target environment database can be identified. For example, an output file can be created for each ETL job with load differences.

At process block 1334, a report including a validation summary is prepared. At process block 1335, validation results (e.g., a pass/fail indicator for each ETL job) can be persisted in a table for comparison with previous and/or subsequent validation runs. For example, a pass/fail indicator for each load run pass can be generated to identify discrepancies or missing records that may have occurred during loading. At process block 1336, a data validation tool is executed, and the results are persisted in a data validation table for comparison with previous and/or subsequent validation runs. The data validation tool can report discrepancies in the actual data that was migrated to the target database environment. At process block 1337, email can be sent reporting failed ETL job results and a description of reasons for validation failure. For example, email can be sent to the engineer running the migration and validation flows. Validation results (including failed ETL job results and descriptions) can also be reported using other suitable techniques, for example, by updating a web page or displaying results in a window of a computer application.

At process block 1338, for failed ETL conversion jobs, input files, configuration data, conversion scripts, and/or validation scripts can be modified and conversion and/or validation jobs re-executed for the failed ETL conversion jobs, or for all conversion and/or validation jobs.

In some examples, the techniques illustrated in FIG. 13 can be implemented using an ETL validation tool that leverages a pre-built knowledge bank based on multiple ETL tools and a database-based ETL process to prepare a validation criteria list. These criteria lists are intended to be an exhaustive list of ETL validation test cases. The ETL validation tool can also automatically generate ETL tool specific load/reject statistics in SQL code based on ETL tool repository tables, ETL process batch files, and/or criteria lists. The ETL validation tool automatically compares migration and validation output and identifies specific details regarding ETL jobs, job level exceptions, session level exceptions, criteria and/or values that are not matching. The ETL validation tool can also persists these details and provide summary results across multiple runs in a table to compare trends across multiple test cycles.

By using an asynchronous process, micro- and macro-ETL validation testing can be tested. Using configuration-based validation script generation reduces effort for test script generation and facilitates automation of script execution.

Exemplary Workflow Across Multiple Workbenches

Figure 14:
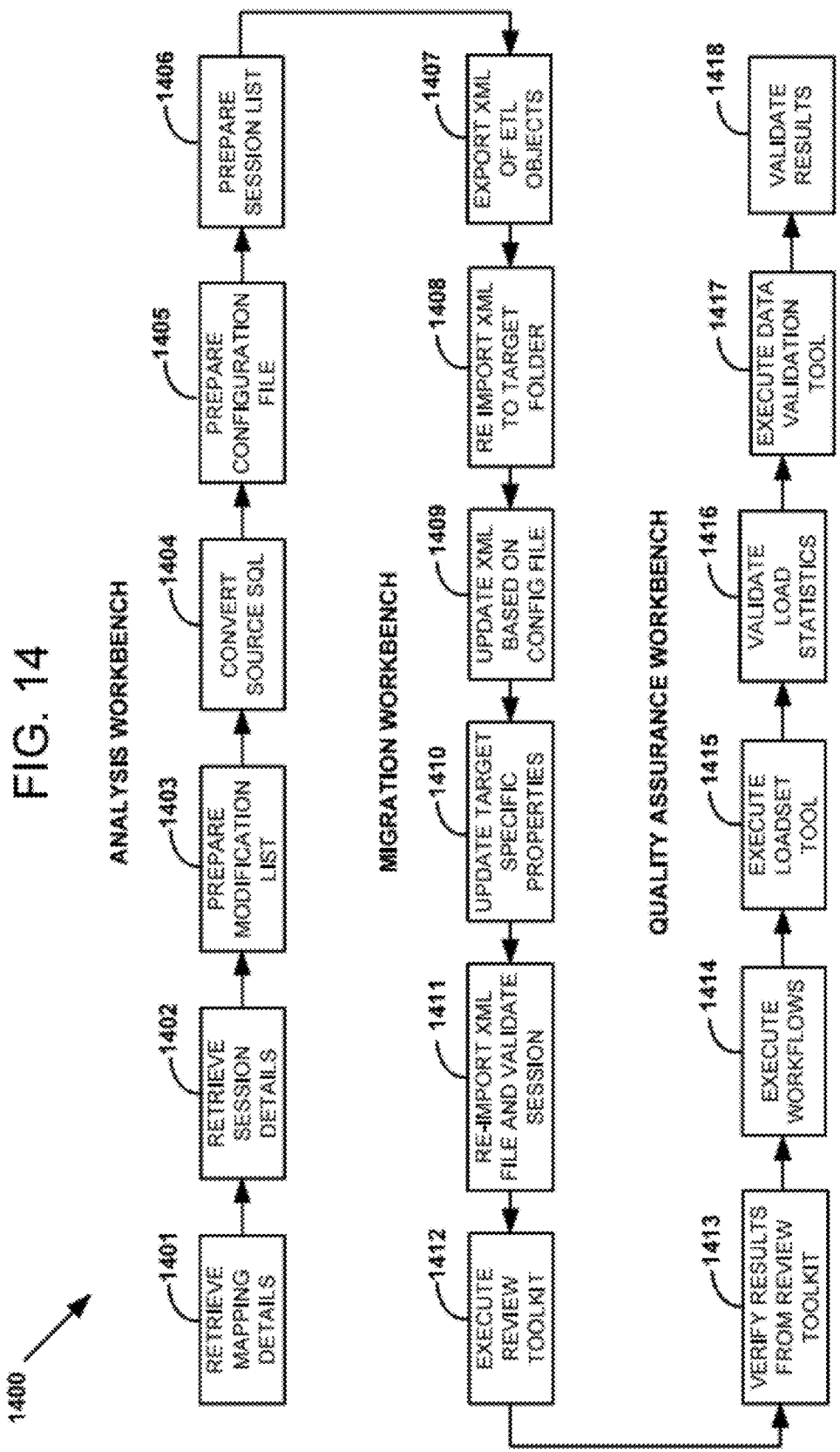
FIG. 14 is a flow chart detailing a method of a conversion of ETL data from a source environment (e.g., an RDBMS-based system) to a target environment (e.g., a data warehouse platform) across multiple system workbenches, including an analysis workbench, a migration workbench, and a quality assurance workbench.

FIG. 14 is a flow chart 1400 illustrating a high level ETL migration process workflow across multiple workbenches. Further details of the illustrated techniques are described above regarding FIGS. 8-13. As shown, the flow includes acts performed by an analysis workbench, a migration workbench, and a quality assurance workbench. At process block 1401, the analysis workbench first retrieves source-to-target environment mapping details. At process block 1402, the analysis workbench retrieves session details. At process block 1403, a modification list is generated. At process block 1404, source SQL is converted to a target-environment compliant format. At process block 1405, configuration files for migration and quality assurance workbenches are generated. At process block 1406, session lists are prepared describing details regarding what source data is to be migrated.

Based on the analysis from the analysis workbench performed at process blocks 1401-1406, a migration workbench is used to perform migration. At process block 1407, XML code is exported representing source ETL objects. At process block 1408, the XML code is re-imported to a target folder in the target environment. At process block 1409, the re-imported XML is updated based on configuration files for the migration. At process block 1410, target-specific properties are updated. At process block 1411, XML data (updated at process blocks 1409 and 1410) is re-imported and the migration session is validated. At process block 1412, a review toolkit is invoked.

Once migration has been performed using the migration workbench at process blocks 1407-1412, a quality assurance workbench is used to validate the results. At process block 1413, results from the review toolkit are reviewed to generate configuration data for executing validation. At process block 1414, one or more validation workflows are executed to validate the migrated ETL data. At process block 1415, load statistics are generated using, for example, a load status tool. The load status tool can use SQL queries against an ETL metadata repository to provide details on the number of records that were extracted, loaded, and/or rejected. At process block 1416, local statistics are validated. At process block 1417, a data validation tool is executed, resulting in validation of ETL migration results (as shown at process block 1418). As shown, the process and outputs are seamlessly integrated across the workbenches, toolsets associated with the workbenches, and with the overall migration process.

Figure 27A:
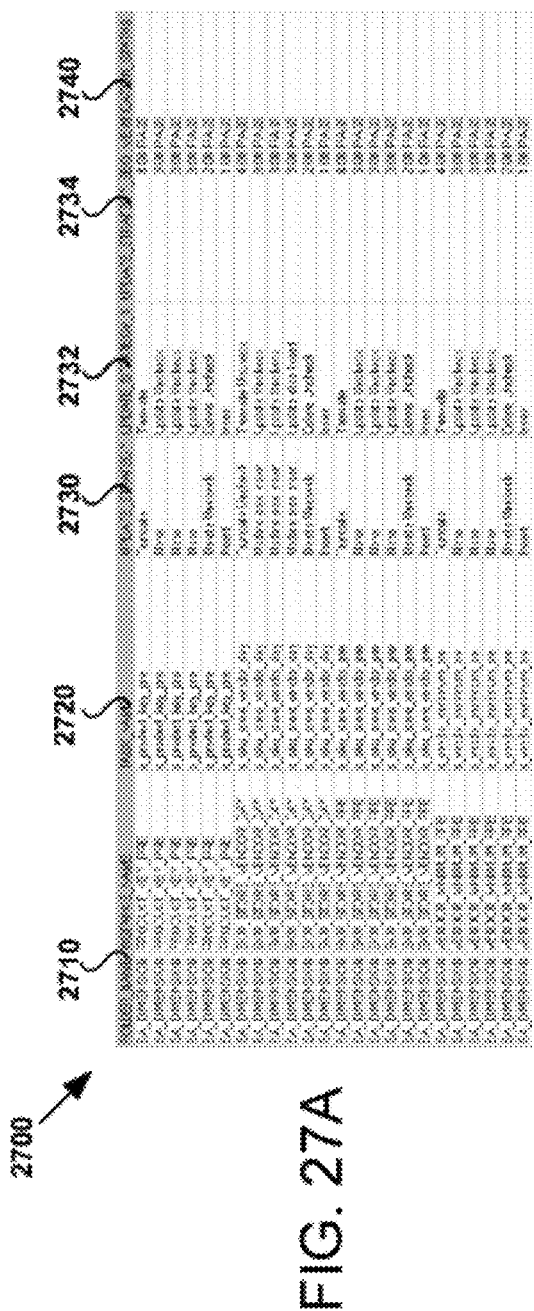
FIGS. 27A, 27B, 28A, and 28B depict output files produced during analysis of a target environment after performing a migration as can be produced in some implementations of data and ETL migration flows disclosed herein.
Figure 27B:
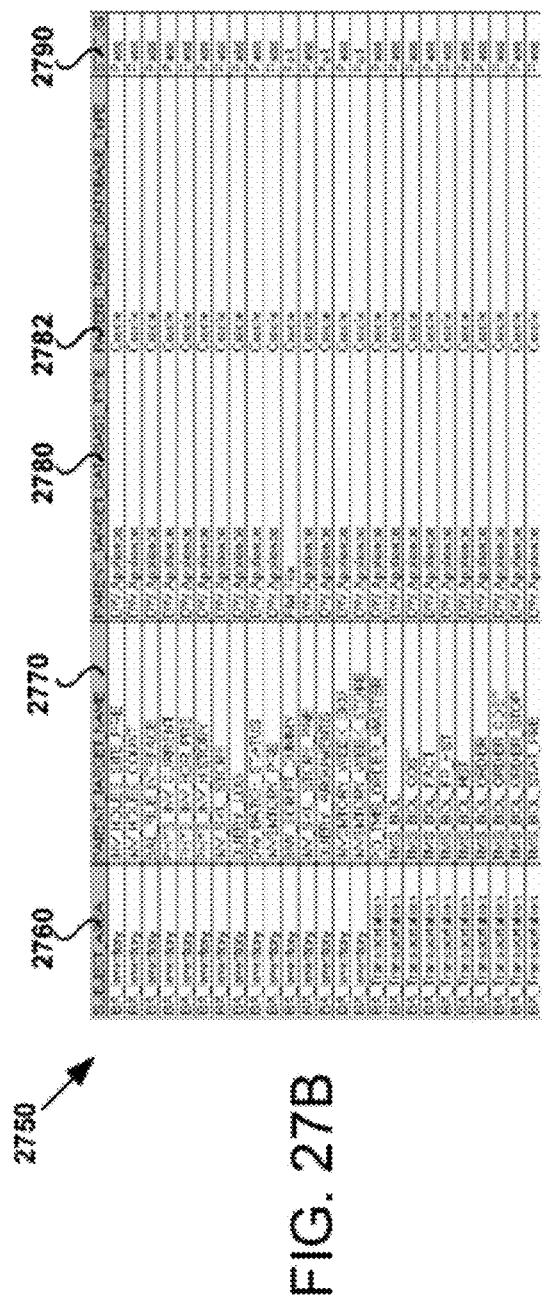

FIGS. 27A and 27B depict output files 2700 and 2750 that can be produced by a quality assurance workbench (e.g., DB quality assurance workbench 230 or ETL quality assurance workbench 260) as part of a validation flow. As shown in FIG. 27A, an output file 2700 includes quality assurance results for a number of session properties that were compared post session conversion in a number of columns store results from an exemplary quality assurance analysis. Column 2710 is a list of folder names and column 2720 is a list of associated quality assurance task names. Also shown are a number of update strategies in columns 2730 and 2732, as well. For example, ETL properties such as update strategies, session properties, and job/sequence properties can be displayed in a column 2734 listing the update strategy sequences (e.g., the order in which updates will be run). Also shown is a column 2740 of pass/fail indicators for the validation flow.

FIG. 27B also includes a number of columns in the output file depiction 2750, which depicts quality assurance results for a target definition review conducted post-conversion. Column 2760 is a list of subject areas, and column 2770 is a list of parent target names. Also shown is a column 2780 listing target database types and a column 2782 listing source database types. Also shown is a column 2790 of pass/fail indicators for the validation flow.

Figure 28A:
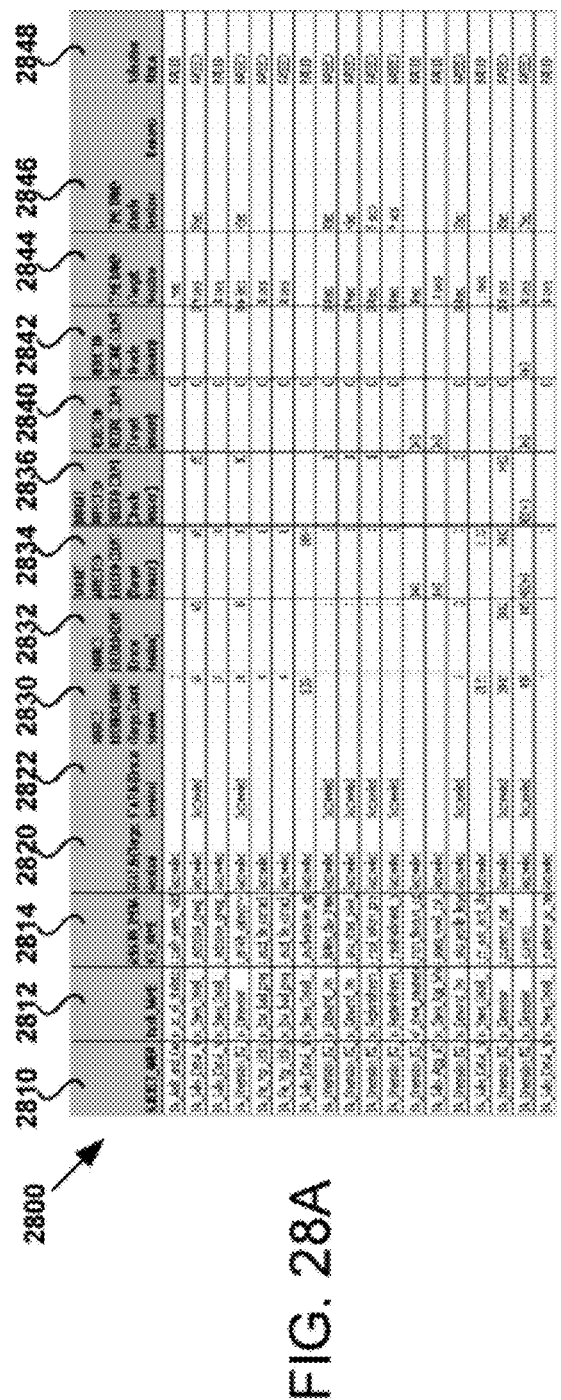

FIG. 28A depicts an output file 2800 with output of a load statistics comparison conducted after data conversion, including a number of columns. Column 2810 is a list of subject areas, and columns 2812, 2814, 2820, and 2822 list corresponding batch names, session instance names, target conversion status, and source conversion status, respectively. Also shown is a count of records in the target environment in column 2830, a count of records in the source environment in column 2832, a count of records affected in the target environment in column 2834, a count of records affected in the source environment in column 2836, a count of rejected records in the target environment in column 2840, and a count of rejected records in the source environment in column 2842. Also shown is a listing of time for conversion in the target environment 2844, and time for conversion in the source environment 2846. Also shown is a column 2848 with a listing of pass/fail indicators for a migration. Thus, the output file 2800 can be used to review the level of success achieved during data or ETL conversion.

Figure 28B:
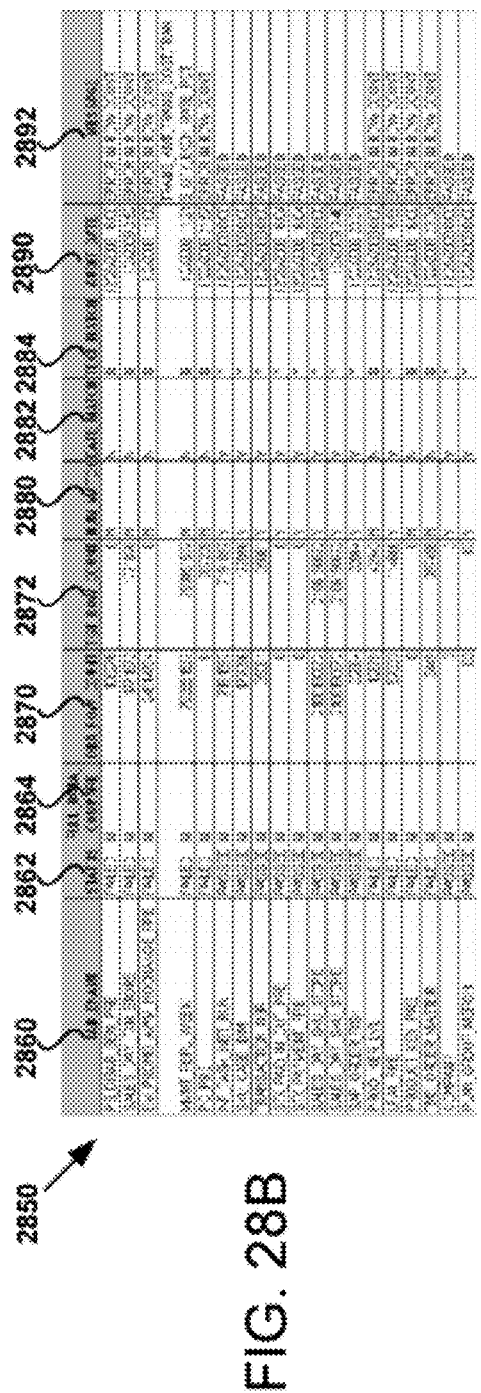

FIG. 28B depicts an output file 2850 with output of a data validation comparison conducted after data conversion, including a number of columns. Column 2860 is a list of migrated tables names, and column 2862 is a corresponding list of pass/fail indicators for the migrated tables. Column 2864 lists whether a full data comparison was performed. Columns 2870 and 2872 list row counts for the source environment and target environment, respectively. Column 2880 is a list of indicators of whether the source and target environment row counts match, and column 2882 is a list of indicators of whether the conversion date matches. Column 2884 is list of indicators of whether the text of the migrated data matches. Column 2890 includes a listing of audit dates and times, and column 2892 is a list of error and warning messages. Thus, the output file 2850 can be used to review the level of success after a data conversion has been conducted.

Additional Exemplary Features

Using the disclosed methods and apparatus, various source to target migrations can be performed using source data warehouse databases and target data warehouse appliances, as shown in the table 1500 of FIG. 15. The following list is exemplary and is not intended to be limiting in any way. For example, migrations including conversion of DDL for Teradata from Oracle, Sybase, DB2 and/or Microsoft SQL server; conversion of DDL for Netezza Twin Fin from Oracle, Sybase, DB2, and/or Microsoft SQL server; datatype conversion for Netezza TwinFin and Teradata from other source databases; database catalog analysis scripts can be executed for Sybase, DB2, Microsoft SQL server, to Teradata and Netezza. In addition, database views and database data can be converted for Teradata and Netezza TwinFin from Oracle, Sybase, DB2 and MS SQL Server. Data migration component for Netezza TwinFin can be converted from Oracle, Sybase, MS SQL Server and IBM DB2. Informatica ETL mapping conversion can be performed using Informatica PowerCenter Maps and automation of XML update process using a metadata file as input. The functionality of XML update process is enhanced to use string-based and/or text-based search, instead of using a tag-based lookup function. The XML update process can be used to convert normal Informatica expressions to DW appliance-specific Informatica expressions, for example, by converting a normal source qualifier to application source qualifier. Further, the data stage job conversion can use the Java SDK. In addition the XML update process of data stage jobs can use a Web-based front end for improved usability.

Further, automatic generation of validation SQL scripts from criteria tables and source database catalog tables can be performed. Text-based search and conversion of SQL based on the metadata and configuration file can also be performed. The replace and string aggregate function in a Netezza TwinFin DW appliance can be implemented using, for example, C++. Incremental validation of data using date range tables and lookup tables can reduce runtime and amount of data that needs to be reviewed to the most recent or most relevant conversion. Further, ETL tool load statistics validation scripts can be used by leveraging ETL toolsets repository tables and session log files.

In addition, conversion of DDL for Oracle Exadata format to Teradata, Netezza, Sybase, DB2 and MS SQL server and data type conversion for Oracle Exadata from other lists of databases can be performed. Database catalog analysis scripts for Teradata and Netezza can be made specific to Exadata. A database view conversion script for Oracle Exadata from Teradata, Sybase, DB2 and MS SQL Server can also be executed. Informatica ETL mapping conversion can be performed using the Informatica PowerCenter Maps for Oracle Exadata and complete automation of XML update processes can be achieved using metadata file as an input for Oracle Exadata. Data stage job conversion can be performed using the Java SDK for conversion of Teradata Enterprise Stage to Oracle Exadata enterprise stage. Further, auto generation of validation SQL scripts from a criteria table and source database catalog tables can be performed for Exadata. Text-based search and conversion of SQL for Exadata can be based on the metadata and configuration file.

Finally, conversion of BTEQ Scripts, TPUMP, Fast Load, MLoad, and Teradata stored procedures to Oracle Exadata can be performed using compliant ETL Jobs & PL/SQL scripts.

Exemplary Computing Environment

Figure 23:
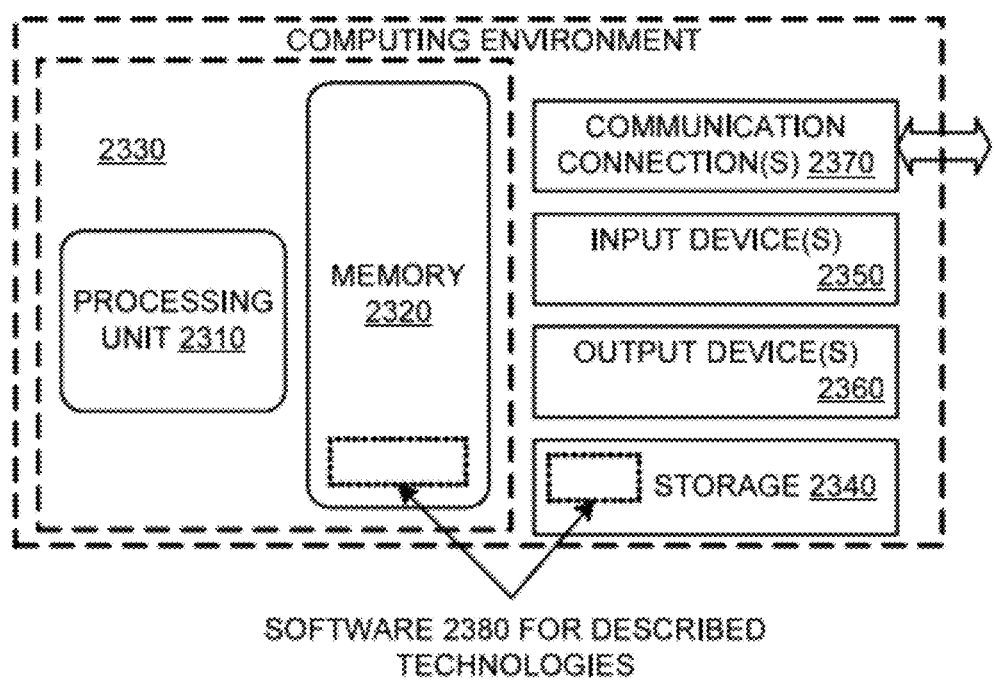
FIG. 23 illustrates a generalized example of a suitable computing environment in which described embodiments, techniques, and technologies can be implemented.

FIG. 23 illustrates a generalized example of a suitable computing environment 2300 in which described embodiments, techniques, and technologies may be implemented. For example, the computing environment 2300 can implement any one or more of a database analysis workbench, an ETL analysis workbench, a database migration workbench, an ETL migration workbench, a database quality assurance workbench, and an ETL quality assurance workbench, as described above. Further, aspects of the computing environment 2300 can be used to implement a source environment (e.g., an RDBMS system) and/or a target environment (e.g., a DW appliance) for use with the migration and validation technologies disclosed herein.

The computing environment 2300 is not intended to suggest any limitation as to scope of use or functionality of the technology, as the technology may be implemented in diverse general-purpose or special-purpose computing environments. The disclosed technology may also be practiced in distributed computing environments where tasks are performed by remote processing devices that are linked through a communications network. In a distributed computing environment, program modules or instructions may be located in both local and remote memory storage devices.

With reference to FIG. 23, the computing environment 2300 includes at least one central processing unit 2310 and memory 2320. In FIG. 23, this most basic configuration 2330 is included within a dashed line. The central processing unit 2310 executes computer-executable instructions. In a multi-processing system, multiple processing units execute computer-executable instructions to increase processing power and as such, multiple processors can be running simultaneously. The memory 2320 may be non-transitory volatile memory (e.g., registers, cache, RAM), non-transitory non-volatile memory (e.g., ROM, EEPROM, flash memory, etc.), or some combination of the two. The memory 2320 stores software 2380 that can, for example, implement the technologies described herein. A computing environment may have additional features. For example, the computing environment 2300 includes storage 2340, one or more input devices 2350, one or more output devices 2360, and one or more communication connections 2370. An interconnection mechanism (not shown) such as a bus, a controller, or a network, interconnects the components of the computing environment 2300. Typically, operating system software (not shown) provides an operating environment for other software executing in the computing environment 2300, and coordinates activities of the components of the computing environment 2300.

The storage 2340 may be removable or non-removable, and includes magnetic disks, magnetic tapes or cassettes, CD-ROMs, CD-RWs, DVDs, or any other non-transitory storage medium which can be used to store information and that can be accessed within the computing environment 2300. The storage 2340 stores instructions for the software 2380, which can implement technologies described herein.

The input device(s) 2350 may be a touch input device, such as a touch screen, keyboard, keypad, mouse, pen, or trackball, a voice input device, a scanning device, or another device, that provides input to the computing environment 2300. For audio, the input device(s) 2350 may be a sound card or similar device that accepts audio input in analog or digital form. The output device(s) 2360 may be a display, touch screen, printer, speaker, CD- or DVD-writer, or another device that provides output from the computing environment 2300.

The communication connection(s) 2370 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 2300. By way of example, and not limitation, with the computing environment 2300, computer-readable media include memory 2320 and/or storage 2340. As should be readily understood, the term computer-readable storage media includes non-transitory storage media for data storage such as memory 2320 and storage 2340, and not transmission media such as modulated data signals.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. The techniques and solutions described in this application can be used in various combinations to provide an improved migration system.

Any of the methods described herein can be performed via one or more computer-readable media (e.g., storage or other tangible media) comprising (e.g., having or storing) computer-executable instructions for performing (e.g., causing a computing device to perform) such methods. Operation can be fully automatic, semi-automatic, or involve manual intervention.

Having described and illustrated the principles of our innovations in the detailed description and accompanying drawings, it will be recognized that the various embodiments can be modified in arrangement and detail without departing from such principles. For example, any technologies described herein for capturing still photos can also be adapted for capturing video. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims and their equivalents.

We claim:

1. A method of migrating data from a source database environment to a target database environment, the source database environment including at least one source database, the method comprising:
    with a computer, analyzing the source database environment and the target database environment, wherein the analyzing comprises extracting a validation criteria list, the validation criteria list comprising a plurality of data validation test cases;
    generating based on the analyzing, a conversion inventory of the source database environment and a configuration data file identifying at least one mapping code and/or script the configuration data file for generating a mapping for converting at least one table in the source database to a format compliant with a target database in the target database environment, the conversion inventory comprising extraction, transformation, and loading (ETL) code from the source database environment;
    generating a target-compliant mapping based on the at least one mapping code and/or script identified by the configuration data file and at least one ETL process characteristic associated with one or both of the source database environment and the target database environment, wherein the at least one process characteristic is stored in an ETL repository, and wherein the generating the target-compliant mapping comprises mapping one or more validation structured query language (SQL) statements based on the extracted validation criteria list; and
    with the computer, migrating the at least one table from the conversion inventory of the source database to the target database environment to produce migrated data in the target database environment, wherein the migrating is performed based at least in part on the target-compliant mapping.

2. The method of claim 1, wherein the source database environment comprises a relational database management system and the target database environment comprises a data warehouse appliance.

3. The method of claim 1, further comprising searching the source database environment for structured query language (SQL) statements and based on the SQL statements and the target-compliant mapping, generating SQL statements compliant with the target database environment.

4. The method of claim 1, wherein:
    the analyzing comprises extracting one or more column lists from the source database environment;
    the generating the target-compliant mapping comprises generating one or more structured query language (SQL) statements based on the extracted column lists and generating an SQL script with translation functions and conversion functions based on the generated SQL statements; and
    the migrating comprises executing the SQL script in the target database environment.

5. The method of claim 1, further comprising:
    persisting output of a target database environment script in a computer-readable storage device to produce persisted output; and
    based on the persisted output, repeating the migrating, wherein the at least one table is selected to be migrated to the target database environment based on the persisted output.

6. The method of claim 1, further comprising validating the migrated data using one or more sets of computer-executable instructions, the computer-executable instructions being generated based at least in part on the configuration data file or the target-compliant mapping.

7. The method of claim 1, wherein:
    the analyzing comprises extracting at least one or more of the following from the source database environment to produce extracted data: a column list, data associated with a column list, or a date range;
    the generating the target-compliant mapping comprises mapping one or more validation structured query language (SQL) statements based on the extracted data; and
    the migrating comprises executing at least a portion of the validation SQL statements in the target database environment.

8. The method of claim 1, further comprising storing at least a portion of the migrated data in a computer-readable storage medium.

9. The method of claim 1, wherein the target-compliant mapping includes mappings for converting at least one or more of the following to a form compliant with the target environment: database (DB)-specific functions, custom structured query language (SQL) usage patterns, custom target loads, DB-specific join syntax, reserved syntax, DB constraints, datatypes, or data definition language (DDL) code.

10. The method according to claim 1, wherein the analyzing comprises:
invoking using the configuration data file, a database analysis script; and
searching using the database analysis script, the source database environment for one or more of datatype usage patterns, index usage patterns, partition usage patterns, database constraint patterns, and source SQL data.

11. A computer-readable storage device comprising computer-executable instructions stored therein for causing the computer to perform a method of migrating data from a source database environment to a target database environment, the source database environment including at least one source database, the method comprising:
analyzing the source database environment and the target database environment to extract a validation criteria list and produce based on the analyzing, a conversion inventory of the source database environment and a configuration data file identifying at least one mapping code and/or script, the configuration data file for generating one or more mappings for data in the conversion inventory of the source database environment to the target database environment, wherein:
the conversion inventory comprises extraction, transformation, and loading (ETL) code from the source database environment;
the generating the one or more mappings comprises mapping one or more validation structured query language (SQL) statements based on the extracted validation criteria list; and
migrating at least a portion of the data to the target database environment, wherein the migrating is performed based at least in part on the mappings generated using the at least one mapping code and/or script identified by the produced configuration data file, wherein the migrating produces migrated data in the target database environment.

12. The computer-readable storage device of claim 11, wherein the computer-executable instructions comprise code for:
extracting at least one or more of the following from the source database environment to produce extracted data: a column list, data associated with a column list, or a date range;
the generating the target-compliant mapping comprises mapping one or more validation structured query language (SQL) statements based on the extracted data; and
the migrating comprises executing at least a portion of the validation SQL statements in the target database environment.

13. The computer-readable storage device of claim 11, wherein the computer-executable instructions comprise code for:
analyzing data stored in a source database in the source environment; and
migrating data from the source database to a target database in the target environment.

14. The computer-readable storage device of claim 11, wherein the computer-executable instructions comprise code for:
analyzing Extraction, Transformation, and Loading (ETL) data stored in the source environment; and
migrating ETL data from the source environment to the target environment.

15. The computer-readable storage device of claim 11, wherein the computer-executable instructions comprise code for:
validating at least a portion of the migrated data.

16. The computer-readable storage device of claim 11, wherein the computer-executable instructions comprise code for:
validating at least a portion of the migrated data to produce validation data; and
repeating the analyzing and the migrating, wherein the analyzing and the migrating are based at least in part on the validation data.

17. A method of migrating source extraction, transformation, and loading (ETL) code from a source environment to a target environment as target ETL code compliant with the target environment, the method comprising, with a computer:
analyzing the source ETL code and the source environment using at least one analysis script to produce a conversion inventory, wherein the analyzing further includes extracting a validation criteria list;
converting at least a portion of the source ETL code to the target ETL code using at least one mapping from the source environment to target environment, wherein the mapping is based at least in part on the extracted validation criteria list and the conversion inventory, and wherein at least a portion of the target ETL code is executable in the target database environment;
generating an input ETL job list with one or more migration validation requirements based on analysis of the source ETL code and the target ETL code;
generating validation results based on the one or more migration validation requirements; and
determining whether to repeat the converting based on the validation results.

18. The method of claim 17, wherein the source ETL code comprises tool-based ETL code.

19. The method of claim 17, wherein the source ETL code comprises script-based ETL code, database-based ETL code, or script-based ETL code and database-based ETL code.

20. The method of claim 17, wherein the converting further comprises:
generating one or more input files for structured query language (SQL) statement conversion, the input files being generated based on at least one or more of the following: datatype usage patterns in the source database environment, database-specific function usage patterns in the source database environment, or custom SQL statement usage patterns in the source environment; and
executing SQL statement conversion code in the target environment, the SQL statement conversion code being based at least in part on the input files for SQL statement conversion.

21. The method of claim 20, wherein the executing the SQL statement conversion code includes at least one or more of the following conversions: converting database-specific join syntax to American National Standards Institute (ANSI)-standard join conventions, converting inline outer join queries to set queries, or converting syntax and/or keywords that are reserved in the target environment to a target environment-specific syntax.

22. The method of claim 17, further comprising:
generating extended markup language (XML) data describing a mapping of the source ETL code to the target database environment;
exporting the XML data to the target environment;
searching and replacing one or more tags from the source environment with target environment-specific metadata tags in the target environment;
replacing source database-specific structured query language (SQL) source system properties with target database-specific SQL source system properties in the target environment; and
compiling and validating the target ETL code in the target environment, wherein the compiling and the validating is based at least in part on the XML data.

23. The method of claim 17, further comprising:
persisting output of a script for the converting the ETL source code in a computer-readable storage device to produce persisted output; and
based on the persisted output, repeating the migrating, wherein at least one table is migrated to the target environment based on the persisted output.

24. The method of claim 17, further comprising generating validation structured query language (SQL) code for validating the target environment based on a criteria list and a date range, the validation SQL being executable in the target environment to validate at least a portion of the target ETL source code.

25. The method of claim 17, wherein the at least one mapping includes mappings for converting at least one or more of the following: database (DB)-specific functions, custom structured query language (SQL) code, custom target load techniques, DB-specific syntax, datatypes, metadata tags, or extraction SQL code.

26. The method of claim 17, wherein the at least one mapping is based on mapping extended markup language (XML) code generated based on a target ETL dictionary.

27. The method of claim 17, further comprising storing at least a portion of the target ETL code in a computer-readable storage medium.

28. A system for migrating a source database environment to a target environment comprising a data warehouse appliance, the source database environment including a source database and source Extraction, Transformation, and Loading (ETL) code, the system comprising:
a memory coupled to at least one processor, the memory storing the source database and the ETL code;
a computer-implemented database analysis workbench stored in the memory, the database analysis workbench for analyzing the source database environment and the target environment to extract a validation criteria list from the source database and produce based on the analyzing, a conversion inventory of the source database environment and a configuration data file identifying at least one mapping code and/or script the configuration data file for migrating data from the source database environment to the data warehouse appliance, the conversion inventory comprising ETL code from the source database environment, wherein the database analysis workbench is further operable to compare an ETL dictionary specifying a plurality of ETL tools with a set of target ETL attributes to generate the configuration data file;
a computer-implemented database migration workbench stored in the memory, the database migration workbench for migrating at least a portion of the data from the source database environment to the data warehouse appliance using one or more mappings based at least in part on one or more validation structured query language (SQL) statements associated with the extracted validation criteria list and identified by the produced configuration data file; and
a computer-implemented database quality assurance workbench stored in the memory, the database quality assurance workbench for validating data migrated to the data warehouse appliance by the database migration workbench.

29. The system of claim 28, further comprising:
a computer-implemented ETL analysis workbench stored in the memory, the ETL analysis workbench for analyzing the source database environment and the target environment to produce ETL configuration data for migrating at least a portion of the source ETL code from the source database environment to the target database environment;
a computer-implemented ETL migration workbench stored in the memory, the ETL migration workbench for migrating at least a portion of the data from the source ETL code to the target database environment using one or more mappings based at least in part on the ETL configuration data; and
a computer-implemented ETL quality assurance workbench stored in the memory, the ETL quality assurance workbench for validating ETL code migrated to the data warehouse appliance by the ETL migration workbench.

* * * * *